(12) United States Patent
D'Amico et al.

(10) Patent No.: US 11,836,886 B2
(45) Date of Patent: Dec. 5, 2023

(54) SYSTEMS AND METHODS FOR CAPTURING AND PROCESSING USER CONSUMPTION OF INFORMATION

(71) Applicant: MetaConsumer, Inc., Redwood City, CA (US)

(72) Inventors: Nathaniel D'Amico, Redwood City, CA (US); Chandrasekhar Vijay Ramaseshan, Davis, CA (US)

(73) Assignee: MetaConsumer, Inc., Redwood City, CA (US)

( * ) Notice: Subject to any disclaimer, the term of this patent is extended or adjusted under 35 U.S.C. 154(b) by 0 days.

(21) Appl. No.: 17/979,336

(22) Filed: Nov. 2, 2022

(65) Prior Publication Data

US 2023/0061646 A1    Mar. 2, 2023

Related U.S. Application Data

(63) Continuation-in-part of application No. 17/721,186, filed on Apr. 14, 2022, now Pat. No. 11,688,035.

(60) Provisional application No. 63/274,738, filed on Nov. 2, 2021, provisional application No. 63/175,237, filed on Apr. 15, 2021.

(51) Int. Cl.
*G06T 3/40* (2006.01)
*H04N 1/00* (2006.01)

(52) U.S. Cl.
CPC .......... *G06T 3/40* (2013.01); *H04N 1/00244* (2013.01)

(58) Field of Classification Search
CPC .............................. G06T 3/40; H04N 1/00244

USPC ....................................................... 382/298
See application file for complete search history.

(56) References Cited

U.S. PATENT DOCUMENTS

| | | | |
|---|---|---|---|
| 7,483,892 B1 | 1/2009 | Sommer et al. | |
| 7,639,943 B1 | 12/2009 | Kalajan | |
| 10,212,306 B1 | 2/2019 | Goyal et al. | |
| 10,685,224 B1 | 6/2020 | Kekatpure | |
| 10,786,742 B1 * | 9/2020 | Mullikin | H04N 21/42224 |
| 11,006,162 B2 * | 5/2021 | Wexler | H04N 23/61 |
| 11,115,625 B1 * | 9/2021 | Stuan | H04R 1/406 |
| 2002/0196986 A1 | 12/2002 | McIntrye | |
| 2005/0219406 A1 | 10/2005 | Ohsawa | |
| 2006/0055808 A1 | 3/2006 | Maeng et al. | |

(Continued)

FOREIGN PATENT DOCUMENTS

| | | | | |
|---|---|---|---|---|
| CN | 1930575 | * | 5/2011 | G10L 15/25 |
| CN | 107003720 | * | 8/2017 | H04L 51/10 |

(Continued)

*Primary Examiner* — Marcellus J Augustin
(74) *Attorney, Agent, or Firm* — Sheppard, Mullin, Richter & Hampton LLP

(57) ABSTRACT

A processing server assists in identifying user consumption of information. The processing server includes a hardware processor, and memory storing computer instructions that when executed perform receiving image data comprising a series of screen image snapshots being presented on a screen of a client device, the screen image snapshots comprising respective timestamps; receiving audio data captured by a microphone of the client device; receiving metadata comprising image metadata, audio metadata, and client device metadata; determining one or more first matches to the image data; determining one or more second matches to the audio data; and aggregating the one or more first matches and the one or more second matches based on the metadata.

18 Claims, 21 Drawing Sheets

Data Capture Network

(56) References Cited

U.S. PATENT DOCUMENTS

| | | |
|---|---|---|
| 2007/0250699 A1 | 10/2007 | Dube et al. |
| 2009/0031425 A1 | 1/2009 | Basson et al. |
| 2012/0192243 A1 | 7/2012 | Hall |
| 2014/0219566 A1 | 8/2014 | Rodriguez et al. |
| 2015/0341559 A1 | 11/2015 | Kelder et al. |
| 2016/0247015 A1 | 8/2016 | Lee et al. |
| 2017/0186029 A1* | 6/2017 | Morris .................. G06Q 50/01 |
| 2017/0279933 A1 | 9/2017 | Schurman et al. |
| 2019/0251117 A1 | 8/2019 | Sharifi |
| 2019/0354766 A1 | 11/2019 | Moore et al. |
| 2019/0361694 A1 | 11/2019 | Gordon et al. |
| 2020/0290089 A1 | 9/2020 | Blohm et al. |
| 2021/0006550 A1* | 1/2021 | Liu ....................... G06F 16/433 |
| 2022/0277324 A1* | 9/2022 | Hutchings .......... G06Q 30/0201 |

FOREIGN PATENT DOCUMENTS

| | | | | |
|---|---|---|---|---|
| JP | 2017529580 A | | 10/2017 | |
| KR | 20150098655 | * | 8/2015 | ......... H04L 65/4015 |
| KR | 20170016817 | * | 2/2017 | ............ H04N 21/44 |
| KR | 20220102134 | * | 7/2022 | ............. H04L 51/52 |
| WO | 2018048356 A1 | | 3/2018 | |

* cited by examiner

SYSTEMS AND METHODS FOR CAPTURING AND PROCESSING USER CONSUMPTION OF INFORMATION

PRIORITY CLAIM

This application claims benefit of U.S. provisional application Ser. No. 63/274,738, entitled "Multi-Signal Mobile Media Exposure Detection and Reporting Sans Asset or Device/User ID Tracking," filed on Nov. 2, 2021, by inventors Nathaniel D'Amico et al., and is a continuation-in-part application of U.S. patent application Ser. No. 17/721,186, entitled "Systems and Methods for Capturing User Consumption of Information," filed on Apr. 14, 2022, by inventors Nathaniel D'Amico et al., which claims benefit of provisional application Ser. No. 63/175,237, entitled "MetaConsumer Adaptive Passive Monitoring Client," filed on Apr. 15, 2021, by inventors Nathaniel D'Amico et al. All of which are hereby incorporated by reference.

TECHNICAL FIELD

This invention relates generally to computer systems, and more particularly provides systems and methods for capturing and processing user consumption of information, such as advertisements and media content.

BACKGROUND

Media consumption and advertising has become ubiquitous across devices. It can be found on web pages, smart devices, televisions, streaming services, radio, etc. Accordingly, with this ubiquity and change in consumer behavior new mechanisms for capturing, processing and reporting on user consumption of advertising, media and/or other information would be helpful.

SUMMARY

Capturing and reporting on content consumption by a user would be important to product and brand managers, media & data brokers, manufacturers, vendors, distributors, service providers, etc. The content consumption information can assist recipients with recognizing user behavior, preferences, user interests, and/or demographic/socio-economic information, which can be used to modify behaviors, e.g., with regard to targeted advertising, sales strategies, product/service development, resource allocation, etc. For example, information about how long a user consumes an advertisement on a car may indicate a possible interest in the purchase of a car, may inform a vendor to target the user for a car, may inform an advertisement provider of the effectiveness of the advertisement, etc. As another example, information on the type of music a user is consuming on a set top box may inform a different music service of recommendations for the user on its phone service.

In some embodiments, the present invention provides a client device configured to assist in identifying user consumption of information, the client device comprising one or more hardware processors; a screen; memory storing computer instructions, the computer instructions when executed by the one or more hardware processors configured to perform capturing a series of screen image snapshots being presented on the screen; reducing resolution of each screen image snapshot in the series of screen image snapshots; capturing metadata associated with each screen image snapshot in the series of screen image snapshots, the metadata at least including a timestamp; identifying a duplicate in the series of screen image snapshots; discarding the duplicate from the series of screen image snapshots; and transferring the series of captured screen image snapshots to a processing server for processing.

The client device may reduce the resolution to a predetermined resolution. The resolution may be based on available memory. The metadata may include information about a discarded duplicate. The instructions may be configured to perform capturing the series of screen image snapshots at a predetermined rate. The predetermined rate may be one screen image snapshot per second. The instructions may be configured to stop capturing screen image snapshots when a battery goes below a threshold battery level. The instructions may be configured to stop capturing screen image snapshots based on a threshold storage value. The instructions may be configured to stop capturing screen image snapshots when a user shuts it down. The instructions may be configured to stop capturing screen image snapshots when a screen is off. The instructions may be configured to stop capturing screen image snapshots when a keyboard is detected.

In some embodiment, the present invention may provide a processor-based method of capturing user consumption of information. The method comprises capturing a series of screen image snapshots being presented on a screen of a client device; reducing resolution of each screen image snapshot in the series of screen image snapshots; capturing metadata associated with each screen image snapshot in the series of screen image snapshots, the metadata at least including a timestamp; identifying a duplicate in the series of screen image snapshots; discarding the duplicate from the series of screen image snapshots; and uploading the series of captured screen image snapshots to a processing server for processing.

The resolution may be a predetermined resolution. The resolution may be based on available memory. The metadata may include information about a discarded duplicate. The capturing may include capturing the series of screen image snapshots at a predetermined rate. The predetermined rate may be one screen image snapshot per second. The method may further comprise stopping capturing screen image snapshots when a battery goes below a threshold battery level. The method may further comprise stopping capturing screen image snapshots based on a threshold storage value. The method may further comprise stopping capturing screen image snapshots when a user shuts it down. The method may further comprise stopping capturing screen image snapshots when a screen is off. The method may further comprise stopping capturing screen image snapshots when a keyboard is detected.

In some embodiments, the present invention provides a processing server configured to assist in identifying user consumption of information, the processing comprising: one or more hardware processors; and memory storing computer instructions, the computer instructions when executed by the one or more hardware processors configured to perform: receiving captured image data comprising a series of screen image snapshots being presented on a screen of a client device, the screen image snapshots comprising respective timestamps; receiving captured audio data captured by a microphone of the client device; receiving metadata comprising image metadata, audio metadata, and client device metadata; determining one or more first matches to the image data, the first matches comprising target image data; determining one or more second matches to the audio data, the second matches comprising target audio data; and aggregating the one or more first matches and the one or more second matches based on the metadata. In some examples, the target image data includes one or more images or thumbnails which are stored in a database associated with the processing server, and indicate or represent events such as advertisements. For example, the target image data may include a computer vision index of an image and/or video, to which the source image data may be compared, in order to find or determine one or more matches. In some examples, the target audio data may also be stored in the database or a different database associated with the processing server, and also indicate or represent events such as advertisements. For example, the source audio data may be compared to or against the target audio data, in order to find or determine one or more matches.

In some embodiments, the metadata comprises timestamps corresponding to the source image data and the source audio data, and the aggregating of the one or more first matches and the one or more second matches is based on a temporal alignment of the timestamps corresponding to the source image data and the source audio data.

In some embodiments, the determining of the one or more first matches comprises converting one or more features of the source image data into one or more vector representations.

In some embodiments, the determining of the one or more first matches is according to a boolean search against an inverted index that maps vector representations to matches.

In some embodiments, the determining of the one or more first matches is invariant to a scaling of the source image data.

In some embodiments, the determining of the one or more second matches is invariant to a pitch of the source audio data.

In some embodiments, the instructions are configured to separate one or more embedded or overlaid elements of the source image data; and the determining of the one or more first matches comprises determining the first matches for each of the one or more embedded or overlaid elements.

In some embodiments, the instructions are configured to remove dense text from the source image data.

In some embodiments, the determining of the one or more first matches is according to one or more probabilities of matching between potential first matches from the target image data and the source image data.

In some embodiments, the determining of the one or more first matches comprises determining a first match for each frame of the source image data and aggregating the determined first matches for sequential frames of the source image data.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Capturing and reporting on content consumption by a user would be important to product and brand managers, media & data brokers, manufacturers, vendors, distributors, service providers, etc. The content consumption information can assist recipients with recognizing user preferences, user behaviors, interests, and/or demographic/socio-economic information, which can be used to modify behaviors, e.g., with regard to targeted advertising, sales strategies, product/service development, resource allocation, etc. For example, information about how long a user consumes an advertisement on a car may indicate a possible interest in the purchase of a car, may inform a vendor to target the user for a car, may inform an advertisement provider of the effectiveness of the advertisement, etc. As another example, information on the type of music a user is consuming on a set top box may inform a different music service of recommendations for the user on its phone service.

Figure 1:
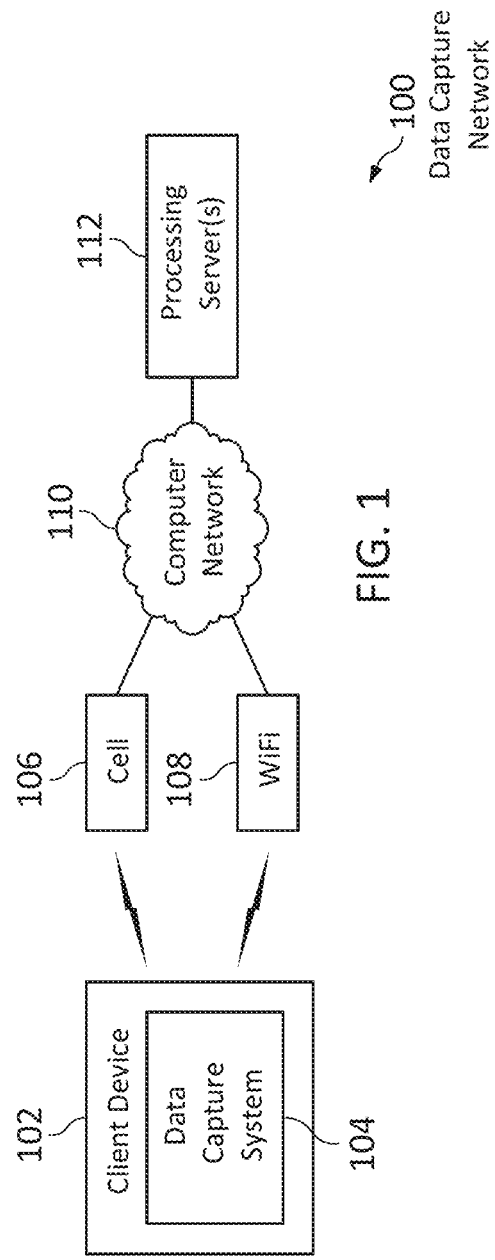
FIG. 1 is a block diagram of a data capture network, in accordance with some embodiments of the present invention.

FIG. 1 is a block diagram of a data capture network 100, in accordance with some embodiments of the present invention. The data capture network 100 includes a client device 102 coupled via a cellular channel 106 (e.g., AT&T, Verizon, T-Mobile, and/or the like) and/or a WiFi channel 108 (home WiFi, public WiFi and/or the like) to a computer network 110, which is connected to one or more processing servers 112. The client device 102 may be any smart device such as laptop, mobile phone, tablet, desktop computer, car entertainment/radio system, game console, smart television, set-top box, smart appliance or general edge-computing device. The client device 102 may belong to one of a number of subscribed users who are participating in a research program about the consumption of particular information, e.g., an advertising campaign for a product and/or service, and/or otherwise consuming or receiving advertisements, an advertising campaign, or other media content. The computer network 110 may include any wide area network, local area network, wireless area network, private network, public network and/or the particular wide area network commonly referred to as the Internet. The one or more processing servers may be one or more computer device capable of processing the information captured by the client device 102 (and other similar client devices of other users).

The client device 102 includes a data capture system 104. The data capture system 104 may include hardware, software and/or firmware configured to perform data collection in a passive and/or active data collection manner, which it optimizes and uploads to the one or more processing servers 112 for processing and analysis. In some embodiments, the data capture system 104 captures screen data, external audio data, and/or device metadata.

In some embodiments, the data capture system 104 performs screen image capture to capture a series of screen image snapshots (frames) on the client device 102. In some embodiments, the data capture system 104 may capture screen image snapshots, e.g., at a particular screen image capture rate, e.g., on a periodic (or other) basis. In some embodiments, the data capture system 104 may capture a screen image snapshot every second, every two seconds, every three seconds, or every n seconds. In some embodiments, the data capture system 104 can be configured via configuration settings to control the screen image capture rate. In some embodiments, the screen image capture rate is controllable only by administrators of the data capture service. In some embodiments, the screen image capture rate is controllable by the user of the client device 102. The one or more processing servers 112 may use the screen image snapshots to identify advertisements, pop-ups, topic information, length of time consuming information and/or other significant content being consumed on the client device 102.

The data capture system 104 may perform external audio capture to capture a series of external audio snapshots, e.g., using a microphone on the client device 102. In some embodiments, the data capture system 104 may capture external audio snapshots of a particular audio sampling size (e.g., one-second sample) at a particular audio sampling rate (e.g., every two second, every three seconds, or every n seconds. In some embodiments, the data capture system 104 can be configured via configuration settings to control the audio sampling size and/or audio sampling rate of external audio capture. In some embodiments, the audio sampling size and/or audio sampling rate is controllable only by administrators of the data capture service. In some embodiments, the audio sampling size and/or audio sampling rate of audio capture is controllable by the user of the client device 102. The one or more processing servers 112 may use the external audio snapshots to identify advertisements, commercials, topic information, length of time consuming information and/or other significant audio content being consumed (music, topic information, etc.), possibly via an external device such as a television or radio, or possibly on the client device 102 itself.

The data capture system 104 may perform a metadata capture process to capture metadata from the client device 102. The metadata may include client device information (e.g., remaining battery life, applications installed, storage resources, memory resources, processor (e.g., central processing unit, CPU) level, etc.), user behavior information (e.g., whether a call is in process, the currently active application, whether the screen is on or off, whether media is being consumed, URL information, device mode of operation (e.g., do-not-disturb mode), etc.), and/or ambient information (e.g., time stamps (e.g., time of day), geolocation, whether the client device connected to a WiFi channel 108, cellular channel 106 or disconnected, whether the client device 102 is plugged in, strength of a wireless network connected to the client device 102, and/or stability of the wireless network connected to the client device 102, etc.). Some metadata is tied to snapshots (e.g., time stamps) and some metadata is tied to the client device 102 (e.g., battery level, geolocation).

Because the data captured may become quite voluminous and resource demanding and because client resources are typically scarce, the device capture system 104 may perform certain optimizations to preserve storage, preserve battery life, reduce transmission burden during data transfers, and reduce processing demands. In some embodiments, because of these optimizations, the device capture system 104 may run 24/7 passively in the background without the user knowing it is running and without any adverse effects while the user operates the client device 102 in a typical fashion.

Example optimizations performed by the data capture system 104 may include screen-capture optimizations, audio-capture optimizations, and metadata-capture optimizations. Screen capture optimizations may include screen resolution reduction, duplicate management, blacklist/whitelist management, keyboard detection, screen-off detection, and/or start/stop control. Example audio-capture optimizations may include audio resolution reduction, microphone monitoring, and/or start/stop control. Metadata capture optimization may include metadata resolution management. Further details of the optimizations is described herein, and particularly with reference to FIG. 3.

The data capture system 104 includes hardware, software and/or firmware to perform a data (asset) upload process to upload the screen data or the source image data, external audio data or the source audio data and/or metadata to the one or more processing servers 112 for processing. Please note that the term "upload" is intended to include all forms of data transfer, whether pull-based, push-based, HTTP(S), FTP, SFTP, etc. Notably, the data capture system 104 may conduct each of these upload events at the same or different upload times and/or upload rates. In some embodiments, the data capture system 104 may batch upload each of the screen data or the source image data, external audio data or the source audio data and/or metadata based on satisfaction of different trigger conditions. The trigger condition may control uploading of each data set (each of the screen data, external audio data, and metadata) at different upload times and/or rates, the screen data and external audio at the same upload times and/or rates and the metadata at different upload times and/or rates, or all three data sets (the screen data, external audio data and metadata) at the same upload time and/or rate. In some embodiments, the trigger condition may occur periodically, a certain times of day, when the data captured reaches a particular size, when the data captured exceeds a certain percentage of available storage, when the client device 102 is connected to a WiFi channel 108, when a wireless network connected to the client device has at least a threshold strength and/or a threshold stability level, when the client device 102 is connected to an external power source, etc., and/or when the client device 102 has at least a threshold level of battery life. In some embodiments, the trigger condition requires the client device 102 to be connected to a WiFi channel 108, and will not allow the data capture system 104 to upload data over a cellular channel 106. In some embodiments, the data capture system 104 enables the user to configure whether to allow data transfer over a cellular channel 106. In some embodiments, the data capture system 104 will allow metadata to be transferred over a cellular channel 106, while disallowing screen data and/or external audio data to be transferred over the cellular channel 106. In other words, in some embodiments, the data capture system 104 may allow an administrator and/or user to control which data set can be uploaded over cellular and/or WiFi.

In some embodiments, the one or more processing servers 112 may include and/or be resident on a cloud-based web service. In some embodiments, the one or more processing servers 112 may be on the client device 102, on other client devices 102, distributed across a plurality of client devices 102, distributed across one or more computing devices that include one or more client devices 102.

Figure 2:
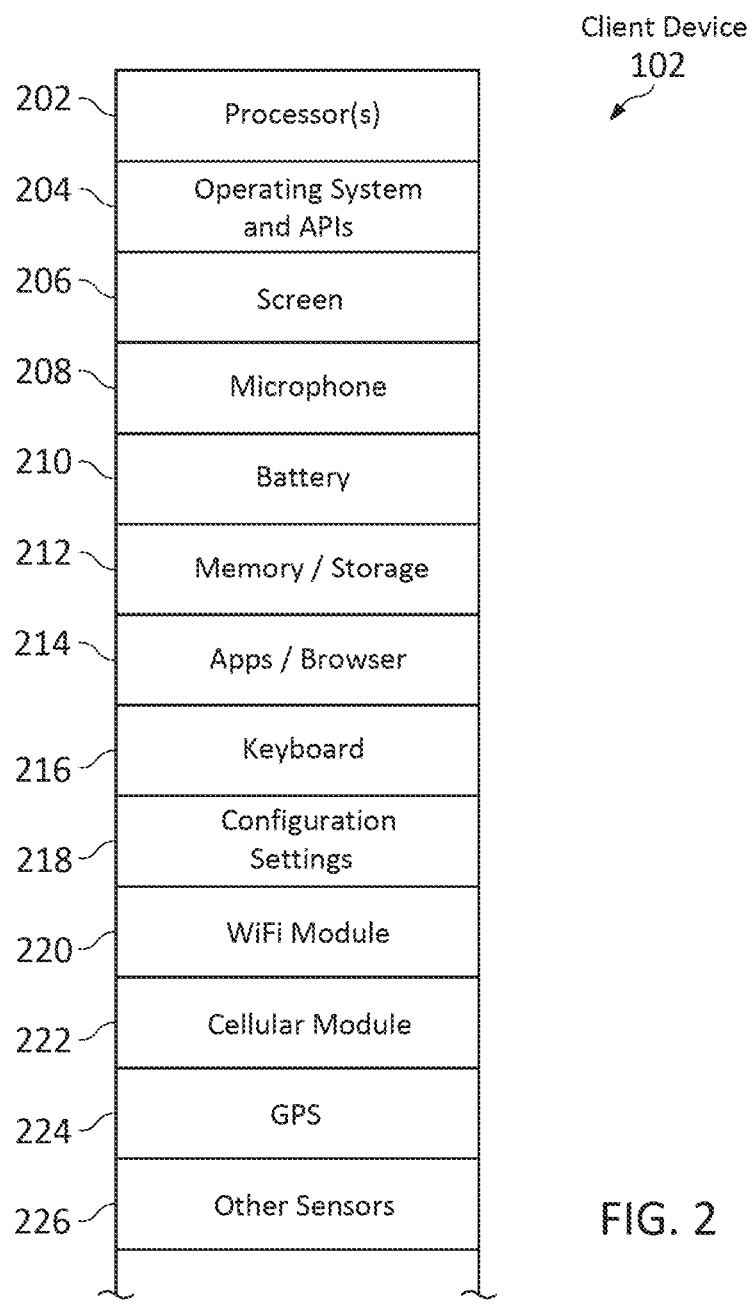
FIG. 2 is a block diagram of a client device, in accordance with some embodiments of the present invention.

FIG. 2 is a block diagram of a client device 102, in accordance with some embodiments of the present invention. As stated above, the client device 102 may be any smart device such as laptop, mobile phone, tablet, desktop computer, car entertainment/radio system, game console, smart television, set-top-box, smart appliance or general edge-computing device.

In some embodiments, the client device 102 includes one or more processors 202, an operating system and application program interfaces (APIs) 204, a screen 206, a microphone 208, a battery 210, memory/storage 212, resident applications including a browser 214, a keyboard 216, configuration settings 218, a WiFi module 220, a cellular module 222, a global positioning system (GPS) 224, and/or one or more other devices/sensors 226 (thermal sensors, accelerometers, light sensors, gyroscopes, front and/or rear cameras, radio frequency capture devices, AM/FM radios, storage expansion slots, device expansion slots, etc.).

The operating system and APIs 204 may be configured to permit the data capture system 104 to obtain information about and/or access to the other elements, e.g., information about the one or more processors 202, the image on the screen 206, sound captured by the microphone 208, information about the battery 210, information about and access to the memory/storage 212, information about the installed applications including the browser 214, information about and access to the keyboard 216, information about and access to the configuration settings 218, information about and access to the WiFi module 220, information about and access to the cellular module 222, information about and access to the global positioning system (GPS) 224, and/or information about and access to the one or more other devices/sensors 226 (thermal sensors, accelerometers, light sensors, gyroscopes, front and/or rear cameras, radio frequency capture devices, AM/FM radios, storage expansion slots, device expansion slots, etc.).

Note that the memory/storage 212 may include a storage slot for expanded storage. In some embodiments, the expanded storage may be treated differently than native storage by the data capture system 104.

Figure 3:
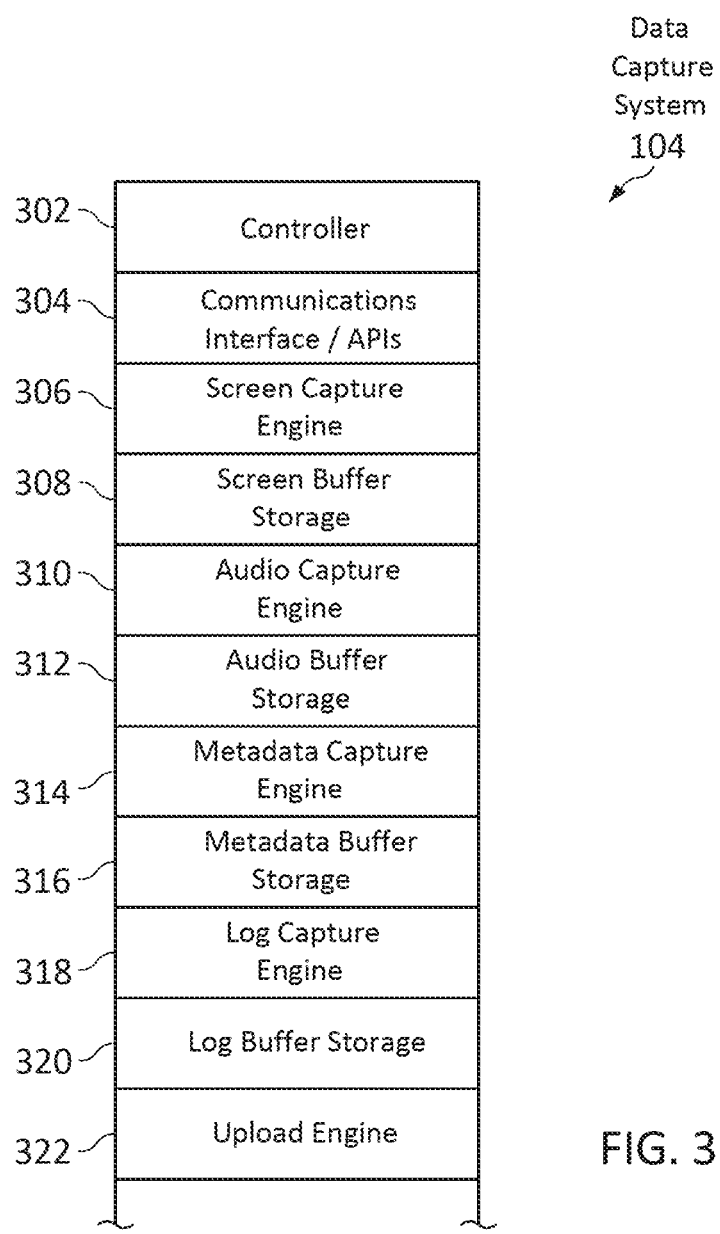
FIG. 3 is a block diagram of a data capture system, in accordance with some embodiments of the present invention.

FIG. 3 is a block diagram of a data capture system 104, in accordance with some embodiments of the present invention. The data capture system 104 includes a controller 302, a communications interface and APIs 304, a screen capture engine 306, screen buffer storage 308, an audio capture engine 310, audio buffer storage 312, a metadata capture engine 314, metadata buffer storage 316, a log capture engine 318, log buffer storage 320, and/or an upload engine 322.

The controller 302 includes hardware, software and/or firmware configured to control the process of the data capture system 104. The controller 302 is configured to manage general operations as well as monitor and manage the other services, such as data management services and notification services. The controller 302 is configured to manage configuration and state information, as well as establish channels to the components within itself, to running the data capture services, and to interactions with the end user. For example, the controller 302 may use the communications interface and APIs 304 to identify when storage is running low, to shut down data capture services that might be filling up storage, to notify the user when storage is getting low and when they should connect to the WiFi 108 to offload some of the captured data, to identify when the battery is running low, to shut down data capture services that might be draining the battery, to notify the user that due to low battery data capture services have been temporarily stopped until recharged, to identify the health of the client device 102 and data capture services, to detect the state of the device, available resources, permissions available and/or the like, to control restarting the data capture system 104 and/or individual data capture services, to prompt the user when permissions have changed or need to be refreshed, and/or to support certain optimizations as discussed below.

The communications interface and APIs 304 include hardware, software and/or firmware configured to enable the data capture system 104, e.g., the controller 302, the screen capture engine 306, the audio capture engine 310, the metadata capture engine 314, the log capture engine 318, and/or the upload engine 322, to communicate with the other components of the client device 102 and/or the one or more processing servers 112. For example, the communications interface and APIs 304 enable the data capture system 104 to communicate with the operating system and APIs 204 to enable the data capture system 104 to obtain information about or access to the other elements, e.g., information about the one or more processors 202, the image on the screen 206, sound captured by the microphone 208, information about the battery 210, information about and access to the memory/storage 212, information about the installed applications including the browser 214, information about and access to the keyboard 216, access to the configuration settings 218, information about and access to the WiFi module 220, information about and access to the cellular module 222, information about and access to the global positioning system (GPS) 224, and/or information about and access to the one or more other devices/sensors 226 (thermal sensors, accelerometers, light sensors, gyroscopes, front and/or rear cameras, radio frequency capture devices, AM/FM radios, storage expansion slots, device expansion slots, etc.). The controller 302 may cooperate with the operating system and APIs 304 to communicate with the elements of the client device 102 and with external elements such as the one or more processing servers 112.

User/Client Onboarding

When a user installs the data capture system 104 on a client device 102 and launches it for the first time, the controller 302 may be configured to perform an onboarding and setup process. The controller 302 may register the client device 102 and/or the user of the client device 102 with the one or more processing servers 112. The controller 302 may instruct the metadata capture engine 314 to capture metadata about the client device 102 and upload the metadata immediately. The controller 302 may register itself with an application program interface (API) on the one or more processing servers 112 for communications. The controller 302 may download configuration settings from the one or more processing servers 112 to configure the data capture system 104, e.g., to set screen capture rate, resolution requirements, audio snapshot sample size, audio snapshot sampling rate, upload rates and times, etc. The controller 302 may also manage encryption and/or authentication information to enable encrypted communications and authentication of the client device 102 and/or user with the one or more processing servers 112.

Further during the onboarding or setup process, the controller 302 may require the user to grant permissions, depending on the client device 102 and its operating system, to collect certain types of data or make local resources available on the client device 102. These permissions may include granting rights to access geolocation information, local storage, the screen image, external audio, local sensors (e.g., microphone, camera, etc.), configuration settings, operating system functions, processor performance information, battery level information, application process information, etc.

Client Configuration Updating

After client onboarding, and at various times, e.g., during re-authentication or status check-in process time, the controller 302 may register with the one or more processing servers 112 to obtain and update configuration parameters. These parameters may dictate behaviors of the data capture system 104, what time of day it collects data, at the frequency it collects data, and other parameters about how the data capture system 104 interacts with the communication interface and APIs 604 (discussed in FIG. 6A) of the one or more processing servers 112. Some examples of configuration parameters include data sampling rates and/or times for screen-capture data, external audio capture data and/or metadata. For example, the configuration parameters may include parameters that define how often to collect screen data, microphone data, other sensor data, geolocation information, available storage, available memory, remaining battery life, the list of applications installed on the client device 102, the running processor level, whether media is playing or not, available network connectivity (e.g., Wi-Fi versus cellular versus none), whether the screen is on or not, whether a call is happening or not, how much data the data capture system 104 has collected on the client device 102, etc.

The data capture system 104 may have default behaviors and values for the configuration parameters. Changes to these configuration parameters may occur in response to new updates, due to past behavior and usage by the user on the client device 102, due to information determined from the client device 102 such as processor type, device type, and/or the like.

The controller 302 may make the configuration settings available via a global store and/or common interface to the user and/or to a system administrator.

Screen Image Capture

The screen capture engine 306 may include hardware, software and/or firmware configured to use the communications interface and APIs 304 to capture screen information including source image data. In some embodiments, the screen capture engine 306 may capture a series of screen image snapshots, e.g., at a particular screen image capture rate, e.g., on a periodic (or other) basis. In some embodiments, the screen capture engine 306 may capture a screen image snapshot every second, every two seconds, every three seconds, or every n seconds, wherein n is any positive number. In some embodiments, the screen capture engine 306 may be configured via configuration settings to control the screen image capture rate. In some embodiments, the screen image capture rate is controllable only by administrators of the data capture service. In some embodiments, the screen image capture rate is controllable by the user of the client device 102. The screen capture engine 306 stores the screen capture information in the screen buffer storage 308, e.g., by placing each screen image snapshot into a respective buffer slot in the screen buffer storage 308.

The data capture system 104 may also perform screen-capture optimizations, which may include screen resolution reduction, duplicate management, blacklist/whitelist management, keyboard detection, screen-off detection and/or start/stop control. These screen-capture optimizations can be performed in order to preserve storage, prolong battery life, provide greater stability to general usage and operation of the client device 102. Some screen-capture optimizations may be performed by the controller 302 (e.g., when shutting down screen capture processes) and some screen-capture optimizations may be performed by the screen capture engine 305 (e.g., when modifying snapshots themselves), although one skilled in the art will recognize that the distinction is relatively loose and interchangeable. In some embodiments, the screen-capture optimizations may depend on the configuration and/or state of the client device 102. In some embodiments, the data capture engine 104 may perform the screen-capture optimizations "in-line", e.g., after screen image capture but before becoming persistently stored locally. In some embodiments, the data capture engine 104 may perform the screen-capture optimizations ad-hoc or after being persistently stored locally.

With screen resolution reduction, the screen capture engine 306 may reduce the screen resolution, e.g., in some embodiments, to a consistent 640×480 image regardless of the actual screen resolution (2k, 4k, 8k, etc.). In some embodiments, the screen capture engine 306 may reduce the screen resolution by a percentage, e.g., 50%, 60%, 70%, etc. In some embodiments, the screen capture engine 306 may reduce the screen resolution based on available memory/storage. In other words, on a client device 102 with significant memory/storage or available memory/storage, the screen capture engine 306 may reduce the image to a first resolution. On a client device 102 with less memory/storage or less available memory/storage, the screen capture engine 306 may reduce the image to a second, lower resolution. Depending on the screen size, supported resolution, etc., different screen capture engines 306 on different client devices 102 can provide smaller or larger screen buffer files for each image snapshot captured. In order to normalize across client devices 102, the screen capture engine 306 can down-sample ("resize") the screen resolution to meet the needs of the data capture engine 104, while still providing a proper asset for later accurate analysis. In some embodiments, the screen resolution is controllable only by administrators of the data capture service. In some embodiments, the screen resolution is controllable by the user of the client device 102.

With duplicate management, the screen capture engine 306 is configured to remove duplicate screen image snapshots. In some embodiments, the screen capture engine 306 stores consecutive screen image snapshots in different (e.g., logically consecutive) buffer storage slots in screen buffer storage 308. The screen capture engine 306 reviews the current screen image snapshot against the previous screen image snapshot to determine if it is identical or sufficiently similar (or insufficiently dissimilar) to the previous screen image snapshot. If identical or sufficiently similar, then in some embodiments the screen capture engine 306 discards (or truncates) the previous (or the current) screen image snapshot. The fact that the screen stayed the same or sufficiently similar in adjacent samples can be maintained in metadata. In some embodiments, the amount of similarity between subsequent screen image snapshots may be controlled based on based on configuration parameters. In some embodiments, the amount of similarity is controllable only by administrators of the data capture service. In some embodiments, the amount of similarity is controllable by the user of the client device 102.

With blacklist/whitelist management, the controller 302 or the screen capture engine 306 is configured to define which applications or URLs or other criteria are assigned to capture or not to capture screen image snapshots. As a whitelist example, the controller 302 or the screen capture engine 306 may be configured to capture screen image snapshots when the YouTube app is the active application. As a blacklist example, the controller 302 or the screen capture engine 306 may be configured to capture screen image snapshots at all times except when the Bank of America app is the active application. In an example where the controller 302 controls blacklist/whitelist management, the controller 302 determines the active application and instructs the screen capture engine 306 to capture or not to capture a screen image snapshot (or alternatively does not instruct the screen capture engine 306 to capture a screen image snapshot). In an example where the screen image capture engine 306 controls blacklist/whitelist management, the controller 302 informs the screen capture engine 306 of the active application and the screen capture engine 306 determines whether to capture or not to capture a screen image snapshot. In some embodiments, the blacklist and/or whitelist configuration is controlled by an administrator. In some embodiments, the blacklist and/or whitelist configuration is controlled by a user.

With keyboard detection, the controller 302 or the screen capture engine 306 is configured to stop screen image capture when the keyboard is active, e.g., so as not to inadvertently capture confidential information such as a password, birthday, social security number, etc. In an example where the controller 302 controls operations based on keyboard detection, the controller 302 determines whether the keyboard is active and instructs the screen capture engine 306 to capture or not to capture a screen image snapshot (or alternatively does not instruct the screen capture engine 306 to capture a screen image snapshot). In an example where the screen image capture engine 306 controls operations based on keyboard management, the controller 302 informs the screen capture engine 306 whether the keyboard is active and the screen capture engine 306 determines whether to capture or not to capture a screen image snapshot. In some embodiments, whether the keyboard being active shuts down the screen image capture is controllable only by administrators of the data capture service. In some embodiments, whether the keyboard being active shuts down the screen image capture is controllable by the user of the client device 102.

With screen-off detection, the controller 302 or the screen capture engine 306 is configured to stop screen image capture when the screen is off. In an example where the controller 302 controls operations based on screen-off detection, the controller 302 determines whether the screen is off and instructs the screen capture engine 306 to capture or not to capture a screen image snapshot (or alternatively does not instruct the screen capture engine 306 to capture a screen image snapshot). In an example where the screen image capture engine 306 controls operations based on screen-off detection, the controller 302 informs the screen capture engine 306 whether the screen is off and the screen capture engine 306 determines whether to capture or not to capture a screen image snapshot. In some embodiments, whether the screen being off shuts down the screen image capture is controllable only by administrators of the data capture service. In some embodiments, whether the screen being off shuts down the screen image capture is controllable by the user of the client device 102.

With start/stop control, the controller 302 or the screen capture engine 306 is configured to allow the user to control the on/off state of the screen image capture. The controller 302 or the screen capture engine 306 determines whether the user has activated or deactivated screen image capture and instructs the screen capture engine 306 to capture or not to capture a screen image snapshot (or alternatively does not instruct the screen capture engine 306 to capture a screen image snapshot) based on the user instructions.

In some embodiments, the controller 302 is configured to control stopping screen image capture based on the state of the client device 102, e.g., when storage is below a threshold amount, when storage is below a percentage of available storage, when the battery is below a certain percentage, when the one or more processors are being used at a great level to handle other system services (e.g., operating system updates, installing security systems, etc.).

External Audio Capture

The audio capture engine 310 may perform external audio capture to capture a series of external audio snapshots, e.g., using the communications interface and APIs 310 to access the microphone 208 on the client device 102. The external audio snapshots may be used to identify advertisements, commercials and/or other significant audio content (music, topic information, etc.), possibly being consumed via an external device such as a television or radio, or possibly being consumed on the client device 102 itself.

The data capture engine 104 may also perform audio-capture optimizations, which may include audio resolution reduction, microphone monitoring, and/or start/stop control. These audio-capture optimizations can be performed in order to preserve storage, prolong battery life, provide greater stability to general usage and operation of the client device 102. Some optimizations may be performed by the controller 302 (e.g., when shutting down audio-capture processes) and some optimizations may be performed by the audio capture engine 305 (e.g., when modifying audio snapshots themselves), although one skilled in the art will recognize that the distinction is relatively loose. In some embodiments, these optimizations may depend on the configuration and/or state of the client device 102. In some embodiments, the data capture engine 104 may perform these optimizations "in-line", e.g., after audio image capture but before becoming persistently stored locally. In some embodiments, the data capture engine 104 may perform these optimizations ad-hoc or after being persistently stored locally.

Different microphones may capture audio samples at different sampling rates. With audio resolution reduction, the audio capture engine 310 may down-sample external audio snapshots to a particular audio sampling size (e.g., one-second sample) at a particular audio sampling rate (e.g., every two second, every three seconds, or every n seconds. The audio capture engine 310 may store the down-sampled external audio snapshots in the audio buffer storage. In some embodiments, the data capture system 104 can be configured via configuration settings to control the audio sampling size and/or audio sampling rate of external audio capture. In some embodiments, the audio sampling size and/or audio sampling rate is controllable only by administrators of the data capture service. In some embodiments, the audio sampling size and/or audio sampling rate of audio capture is controllable by the user of the client device 102.

With microphone monitoring, the controller 302 or the audio capture engine 310 is configured to stop capturing external audio snapshots when the microphone is being used or has been requested by another component, e.g., for a phone call, voice-over-internet-protocol (VOIP) call, speech-to text control, voice control, etc. In an example where the controller 302 controls operations based on microphone detection, the controller 302 determines whether the microphone is in use or has been requested for use and instructs the audio capture engine 310 to capture or not to capture an external audio snapshot (or alternatively does not instruct the audio capture engine 310 to capture an external audio snapshot). In an example where the audio capture engine 310 controls operations based on microphone detection, the controller 302 informs the audio capture engine 310 whether the microphone is in use or has been requested for use and the audio capture engine 310 determines whether to capture or not to capture an external audio snapshot.

With start/stop control, the controller 302 or the audio capture engine 310 is configured to allow the user to control the on/off state of the external audio capture. The controller 302 or the audio capture engine 310 determines whether the user has activated or deactivates audio capture and instructs the audio capture engine 310 to capture or not to capture an external audio snapshot (or alternatively does not instruct the audio capture engine 310 to capture an external audio snapshot) based on the user instructions.

In some embodiments, the controller 302 is configured to control stopping external audio capture based on the state of the client device 102, e.g., when storage is below a threshold amount, when storage is below a percentage of available storage, when the battery is below a certain percentage, when the one or more processors are being used at a great level to handle other system services (e.g., operating system updates, installing security systems, etc.).

Corruption Control

In some embodiments, it has been found that operations avoid corruption when the data capture system 104 or individual components, such as the screen capture engine 306 and audio capture engine 310, are cycled (switched off and back on) periodically, e.g., every 15 minutes. Alternatively, the data capture system 104 or individual components may be cycles based on a different trigger condition, e.g., based on the file size. This apparently keeps things on the client device 102 in a "clean state" and avoids buffer corruption, which seems to occur when the service runs too long. This also reduces file size for the upload process, since the files will be segment into smaller, e.g., "15-minute", chunks.

In some embodiments, the data capture engine 104 or individual components, such as the screen capture engine 306 and audio capture engine 310, are configured to truncate capture buffers into smaller persisted file fragments to avoid buffer corruption. In some embodiments, the data capture system 104 can be configured via configuration settings to control the segment size and/or trigger condition. In some embodiments, the segment size and/or trigger condition is controllable only by administrators of the data capture service. In some embodiments, the segment size and/or trigger condition is controllable by the user of the client device 102.

Metadata Collection

The metadata capture engine 314 includes hardware, software and/or firmware configured to perform a metadata capture process to capture metadata from the client device 102. The metadata capture engine 314 stores the captured metadata in the metadata buffer storage 316, possibly in structured form or schema driven flat files. The metadata may include client device information (e.g., remaining battery life, applications installed, storage resources, memory resources, processor (e.g., central processing unit, CPU) level, etc.), user behavior information (e.g., whether a call is in process, the currently active application, whether the screen is on or off, whether media is being consumed, URL information, device mode of operation (e.g., do-not-disturb mode), etc.), and/or ambient information (e.g., timestamps, geolocation, whether the client device connected to a WiFi channel 108, cellular channel 106 or disconnected, whether the client device 102 is plugged in, etc.).

The metadata capture engine 312 may capture the metadata based on the configuration parameters that define sampling rates and sampling times for each metadata item. Sampling rate may indicate the frequency of sampling the information. Sampling time may indicate whether the samples are taken at the same time or at different times. For example, the configuration settings may indicate to sample two different pieces of metadata every five seconds and to collect them at the same time. For another example, the configuration settings may indicate to sample two different pieces of metadata every five seconds but not necessarily to collect them at the same time. For yet another example, the configuration settings may indicate to sample two different pieces of metadata at different rates and possibly to collect them at different times.

As indicated above, some metadata is tied to snapshots, and therefore will be captured and associated with each snapshot. For example, metadata tied to snapshots may include URL information and/or timestamps. Some metadata is tied to the client device 102, and therefore need not be captured with each snapshot.

Metadata Optimizations

Metadata capture optimization may include metadata resolution management. The metadata capture engine 314 may sample different metadata at different sampling rates. For example, the metadata capture engine 314 may capture predictably fast-changing variables more often and predictably slow-changing variables less often. Alternatively and/or additionally, the metadata capture engine 314 may capture predictably more storage- or CPU-demanding variables less often and predictably lower storage- or CPU-demanding variables more often. For example, the metadata capture engine 314 may capture geolocation, battery life, available storage, and installed applications a low frequency. The metadata capture engine 314 may capture the active/foreground application, whether the screen is on or off, whether the user is on or receiving a call, discarded screen image snapshots, and whether the keyboard is active or not at a high frequency (higher than the low frequency). Notably, the frequency of each metadata type may be controlled such that each metadata type may have a different frequency or such there can be any number of frequency groups to which the various metadata types belong.

Log Status Synchronization

The log capture engine 318 may include hardware, software and/or firmware configured to capture status information (e.g., how much data has been captured, how much of each data type (screen image snapshots, external audio snapshots, metadata snapshots, etc.) has been captured, crash reports, etc.). The log capture engine 318 stores the status information in the log buffer storage 320. Upon the satisfaction of a trigger condition, e.g., periodically, at various times, etc., the log capture engine 318 may take inventory of "log records" of the amount of data, e.g., screen image snapshots, external audio snapshots, metadata, captured and not yet synchronized. Log status information may be uploaded separately or with other data types, at the same or at different times, over the same or different channels, at the same or different frequency than metadata. In some embodiments, the log capture engine 318 can be configured via configuration settings to control the trigger condition. In some embodiments, the trigger condition is controllable only by administrators of the data capture service. In some embodiments, the trigger condition is controllable by the user of the client device 102.

Upon successful synchronization, log capture engine 318 record the state of events. Captured log information can persist in the log buffer storage 320 and/or be truncated based on storage needs and/or configuration parameters.

Upload Service

The upload engine 322 includes hardware, software and/or firmware to perform a data (asset) upload process to upload the screen data/source image data, external audio data/source audio data and/or metadata to the one or more processing servers 112 for processing. These assets are typically, but not limited to images and audio files, schema'd flat files (e.g., JSON formatted data files), and other. Notably, the upload engine 322 may conduct each of these upload processes over the same or separate batch upload times and/or upload rates. In some embodiments, the upload engine 322 may upload each of the screen data/source image data, external audio data/source audio data and/or metadata based on satisfaction of different trigger conditions. The trigger condition may control uploading of each data set (each of the screen data/source image data, external audio data/source audio data, and metadata) at different times and/or rates, the screen data/source image data and external audio data/source audio data at the same times and/or rates and the metadata at different times and/or rates, or all three data sets (the screen data/source image data, external audio data/source audio data and metadata) at the same time and/or rate. In some embodiments, the trigger condition may occur periodically, a certain times of day, when the data captured reaches a particular size, when the data captured exceeds a certain percentage of available storage, when connected to a WiFi channel 108, etc. In some embodiments, the trigger condition requires the client device 102 to be connected to a WiFi channel 108, and will not allow the upload engine 322 to upload data over a cellular channel 106. In some embodiments, the upload engine 322 enables the user to configure whether to allow data transfer over a cellular channel 106. In some embodiments, the upload engine 322 will allow metadata to be transferred over a cellular channel 106, while disallowing screen data and/or external audio data to be transferred over the cellular channel 106. In other words, in some embodiments, the upload engine 322 may allow an administrator and/or user to control which data set can be uploaded over cellular and/or WiFi.

A typical upload process includes:

Gather metadata and other about local storage state.

Submit to a communications interface and APIs of the one or more processing servers 112 the metadata and log records.

Request permission from the one or more processing servers 112 to upload, which if granted the one or more processing servers 112 will provide an authenticated channel.

Persist the "asset bundle" and data to the one or more processing servers 112.

Upon successful completion flag data as synchronized.

Optional inline or future step to truncate data on the client device 102 based on configuration and local client device 102 needs.

In some embodiments, the upload engine 320 can be configured via configuration settings to control the upload times and/or upload rates. In some embodiments, the upload times and/or upload rates are controllable only by administrators of the data capture service. In some embodiments, the upload times and/or upload rates are controllable by the user of the client device 102.

Upload Optimizations

Depending on the configuration and/or state of the client device 102, some upload optimizations may include uploading only when the internet is accessible via a WiFi channel 108, because WiFi typically has reduced battery consumption, increased bandwidth available, and costs less to the user. Upload optimizations may include determining when storage on the device is getting full and/or the number of files has reached a threshold number, and therefore storage space may be needed. Upload optimization may include uploading oldest assets first. Upload optimizations may include to upload at preferred times, such as when the device is idle, the device is plugged in, the battery is above a certain percentage, the device is likely to be idle such as in the middle of the night, etc. Upload optimization may also include selecting a predetermined the number of files to bundle at a given upload instance. The upload optimization may define the "max bundle size" or "max bundle duration" (e.g., the oldest and newest assets in the bundle differ by less than X hours).

In some embodiments, the upload engine 320 can be configured via configuration settings to control the upload optimizations. In some embodiments, one, some or all of the upload optimizations are controllable only by administrators of the data capture service. In some embodiments, one, some or all of the upload optimizations are controllable by the user of the client device 102.

Data Management Services

In some embodiments, for storage optimization, the controller 302 detects the available storage on the "main disk" and the existence extended storage (e.g., secure-digital (SD) card). If extended storage is available, the controller 302 may use the most opportunistic storage available based on which one has the most space for screen buffer storage 308, audio buffer storage 312, metadata buffer storage 316, and/or log buffer storage 320. Notably, each of these different data types may use different storage. In some embodiments, as the environment changes, the controller 302 may adaptively shift its storage usage and location.

In some embodiments, the controller 302 may run different services in isolation or in concert. The controller 302 may initiate a health check upon start-up to ensure operations are functioning correctly.

Figure 4:
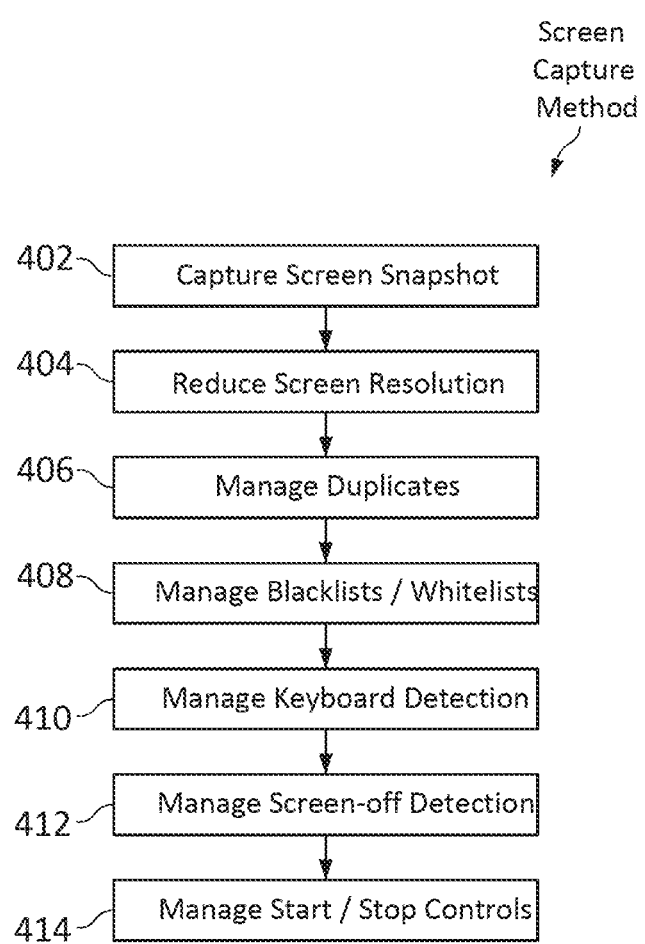
FIG. 4 is a flowchart of a method of screen capture, in accordance with some embodiments of the present invention.

FIG. 4 is a flowchart of a method 400 of screen capture, in accordance with some embodiments of the present invention. Method 400 begins in step 402 with the screen capture engine 306 capturing a screen image snapshot. In some embodiments, the screen capture engine 306 captures screen image snapshots, e.g., at a particular screen image capture rate, e.g., on a periodic (or other) basis. In some embodiments, the screen capture engine 306 captures a screen image snapshot every second, every two seconds, every three seconds, or every n seconds. In some embodiments, the screen capture engine 306 may be configured via configuration settings to control the screen image capture rate. The screen capture engine 306 stores the screen capture information in the screen buffer storage 308, e.g., by placing each screen image snapshot into a respective buffer slot in the screen buffer storage 308.

In step 404, the screen capture engine 306 reduces screen image resolution. In some embodiments, the screen capture engine 306 reduces the screen resolution to a consistent 640×480 image regardless of the actual screen resolution (2k, 4k, 8k, etc.), by a percentage, e.g., 50%, 60%, 70%, or the like. In some embodiments, the screen capture engine 306 reduces the screen resolution based on available memory/storage.

In step 406, the screen capture engine 306 manages duplicates. In some embodiments, the screen capture engine 306 stores consecutive screen image snapshots in different (e.g., logically consecutive) buffer storage slots in screen buffer storage 308. The screen capture engine 306 reviews the current screen image snapshot against the previous screen image snapshot to determine if it is identical or sufficiently similar (or insufficiently dissimilar) to the previous screen image snapshot. If identical or sufficiently similar, then in some embodiments the screen capture engine 306 discards (or truncates) the previous (or the current) screen image snapshot. The fact that the screen stayed the same or sufficiently similar in adjacent samples can be maintained in metadata. In some embodiments, the amount of similarity between subsequent screen image snapshots may be controlled based on based on configuration parameters.

In step 408, the controller 302 or the screen capture engine 306 manages blacklists and/or whitelists. In some embodiments, the controller 302 or the screen capture engine 306 may define which applications or URLs or other criteria are assigned to capture or not to capture screen image snapshots. In an example where the controller 302 controls blacklist/whitelist management, the controller 302 determines the active application and instructs the screen capture engine 306 to capture or not to capture a screen image snapshot (or alternatively does not instruct the screen capture engine 306 to capture a screen image snapshot). In an example where the screen image capture engine 306 controls blacklist/whitelist management, the controller 302 informs the screen capture engine 306 of the active application and the screen capture engine 306 determines whether to capture or not to capture a screen image snapshot.

In step 410, the controller 302 or the screen capture engine 306 manages keyboard detection. In some embodiments, the controller 302 or the screen capture engine 306 stops screen image capture when the keyboard is active, e.g., so as not to inadvertently capture confidential information such as a password, birthday, social security number, etc. In an example where the controller 302 controls operations based on keyboard detection, the controller 302 determines whether the keyboard is active and instructs the screen capture engine 306 to capture or not to capture a screen image snapshot (or alternatively does not instruct the screen capture engine 306 to capture a screen image snapshot). In an example where the screen image capture engine 306 controls operations based on keyboard management, the controller 302 informs the screen capture engine 306 whether the keyboard is active and the screen capture engine 306 determines whether to capture or not to capture a screen image snapshot.

In step 412, the controller 302 or the screen capture engine 306 manages screen-off detection. In some embodiments, the controller 302 or the screen capture engine 306 stops screen image capture when the screen is off. In an example where the controller 302 controls operations based on screen-off detection, the controller 302 determines whether the screen is off and instructs the screen capture engine 306 to capture or not to capture a screen image snapshot (or alternatively does not instruct the screen capture engine 306 to capture a screen image snapshot). In an example where the screen image capture engine 306 controls operations based on screen-off detection, the controller 302 informs the screen capture engine 306 whether the screen is off and the screen capture engine 306 determines whether to capture or not to capture a screen image snapshot.

In step 414, the screen capture engine 306 manages start/stop controls. In some embodiments, the controller 302 or the screen capture engine 306 allows the user to control the on/off state of the screen image capture. The controller 302 or the screen capture engine 306 determines whether the user has activated or deactivated screen image capture and instructs the screen capture engine 306 to capture or not to capture a screen image snapshot (or alternatively does not instruct the screen capture engine 306 to capture a screen image snapshot) based on the user instructions.

Figure 5:
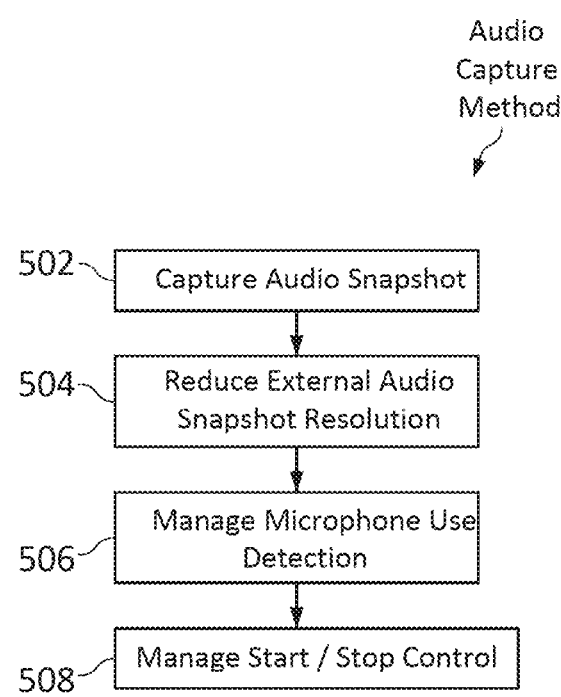
FIG. 5 is a flowchart of a method of audio capture, in accordance with some embodiments of the present invention.

FIG. 5 is a flowchart of a method 500 of audio capture, in accordance with some embodiments of the present invention.

The method 500 begins in step 502 with the audio capture engine 310 capturing an external audio snapshot. In some embodiments, the audio capture engine 310 performs external audio capture to capture external audio snapshots, e.g., using the communications interface and APIs 310 to access the microphone 208 on the client device 102.

In step 504, the audio capture engine 310 reduces the external audio snapshot resolution. In some embodiments, the audio capture engine 310 may down-sample external audio snapshots to a particular audio sampling size (e.g., one-second sample) at a particular audio sampling rate (e.g., every two second, every three seconds, or every n seconds. The audio capture engine 310 may store the down-sampled external audio snapshots in the audio buffer storage. In some embodiments, the data capture system 104 can be configured via configuration settings to control the audio sampling size and/or audio sampling rate of external audio capture In step 506, the controller 302 or the audio capture engine 310 manages microphone use detection. In some embodiments, the controller 302 or the audio capture engine 310 is configured to stop capturing external audio snapshots when the microphone is being used or has been requested by another component, e.g., for a phone call, voice-over-internet-protocol (VOIP) call, speech-to text control, voice control, etc. In an example where the controller 302 controls operations based on microphone detection, the controller 302 determines whether the microphone is in use or has been requested for use and instructs the audio capture engine 310 to capture or not to capture an external audio snapshot (or alternatively does not instruct the audio capture engine 310 to capture an external audio snapshot). In an example where the audio capture engine 310 controls operations based on microphone detection, the controller 302 informs the audio capture engine 310 whether the microphone is in use or has been requested for use and the audio capture engine 310 determines whether to capture or not to capture an external audio snapshot.

In step 508, the controller 302 or the audio capture engine 310 manages start/stop control. In some embodiments, the controller 302 or the audio capture engine 310 is configured to allow the user to control the on/off state of the external audio capture. The controller 302 or the audio capture engine 310 determines whether the user has activated or deactivates audio capture and instructs the audio capture engine 310 to capture or not to capture an external audio snapshot (or alternatively does not instruct the audio capture engine 310 to capture an external audio snapshot) based on the user instructions.

Figure 6A:
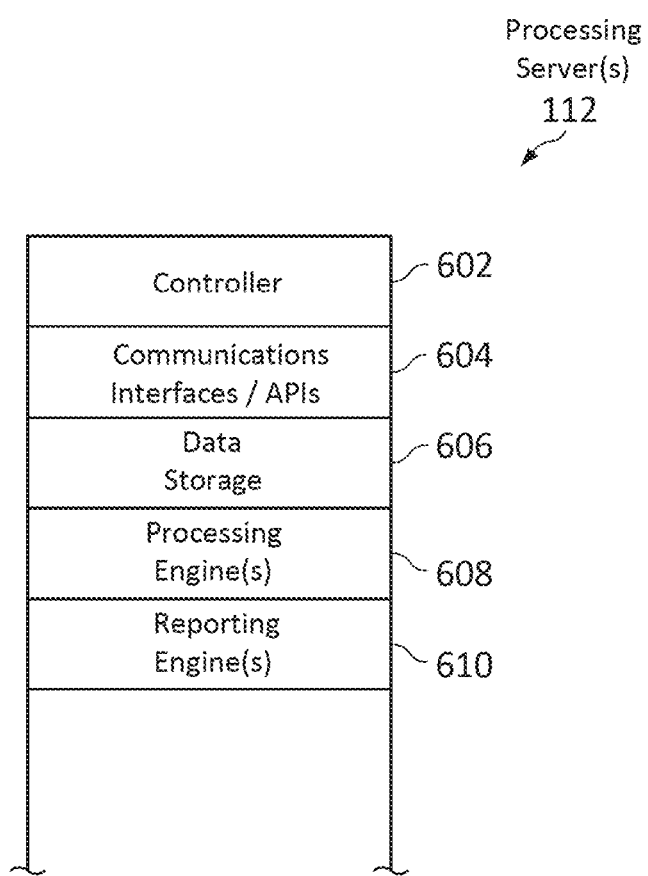
FIG. 6A is a block diagram of a processing server, in accordance with some embodiments of the present invention.

FIG. 6A is a block diagram of the one or more processing servers 112, in accordance with some embodiments of the present invention. The one or more processing server 112 includes a controller 602, a communications interface and APIs 604, data storage 606, one or more processing engines 608 and/or one or more reporting engines. Further details regarding the processing servers 112, in particular, the processing engines 608, are described in the subsequent figures.

The controller 602 includes hardware, software and/or firmware configured to control the process of the one or more processing servers 112. The controller 602 is configured to manage general operations as well as monitor and manage the other services, such as data processing services and notification services. The controller 602 is configured to manage configuration and state information, as well as establish channels to the components within itself, to running the data processing services, and to interactions with various users. For example, the controller 602 may use the communications interface and APIs 604 to receive batch uploads from the client device 102, to use the data storage 606 to store the batch uploads, to use the one or more processing engines 608 to process the data within the batch uploads to identify instances of information consumption, e.g., consumption of advertisements, and to use the one or more reporting engines 610 to report its findings to various users, e.g., advertisers, subscribers, vendors, etc.

The communications interface and APIs 604 include hardware, software and/or firmware configured to enable the one or more processing servers 112, e.g., the controller 602, one or more processing engines 608 and/or one or more reporting engines 610, to communicate with the other components of the one or more processing servers 112 and/or the client device 102.

The controller 602 may be configured to assist with the onboarding and setup process. The controller 602 may register the client device 102 and/or the user of the client device 102. The controller 602 may instruct the data capture system 104 to capture metadata about the client device 102 and upload the metadata immediately. The controller 602 may register the communications interface and APIs 304 on the client device 102. The controller 602 may provide configuration settings to configure the data capture system 104, e.g., to set screen capture rate, resolution requirements, audio snapshot sample size, audio snapshot sampling rate, upload rates and times, etc. The controller 602 may also manage encryption and/or authentication information to enable encrypted communications and authentication with the client device 102.

After client onboarding, and at various times, e.g., during re-authentication or status check-in process time, the controller 602 may provide updated configuration parameters. These parameters may dictate behaviors of the data capture system 104, what time of day it collects data, at the frequency it collects data, and other parameters about how the data capture system 104 interacts with the communication interface and APIs 304 of the client device 102. Some examples configuration parameters include data sampling rates and/or times for screen-capture data, external audio capture data and/or metadata. For example, the configuration parameters may include parameters that define how often to collect screen data, microphone data, other sensor data, geolocation information, available storage, available memory, remaining battery life, the list of applications installed on the client device 102, the running processor level, whether media is playing or not, available network connectivity (e.g., WiFi versus cellular versus none), whether the screen is on or not, whether a call is happening or not, how much data the data capture system 104 has collected on the client device 102, etc.

The data capture system 104 may have default behaviors and values for the configuration parameters. Changes to these configuration parameters may occur in response to new updates, due to past behavior and usage by the user on the client device 102, due to information determined from the client device 102 such as processor type, device type, and/or the like.

The one or more processing engines 608 may include hardware, software and/or firmware configured to process the data within the batch uploads to identify instances of information consumption, e.g., consumption of advertisements. In some embodiments, the one or more processing engines 608 may search the screen image snapshots to identify instances of a pop-up advertisement or other image on the screen 206 of the client device 102 and to determine the amount of time that the image was on the screen 206 and thus likely consumed by the user. The amount of time may be determined using the metadata, e.g., timestamps. The one or more processing engines 608 may search the external audio snapshots for particular audio consumption. In some embodiments, the one or more processing engines 608 may use acoustic fingerprints to identify advertisements and/or other content. The system can use voice fingerprints, frequency information, spectrograms, pulse code modulation, etc.

The one or more reporting engines 610 may include hardware, software and/or firmware configured to generate reports that identify the information consumption data (whether about a single end user, a group of end users, a demographic of end users, all end users, etc.). The one or more reporting engines 610 pay provide these reports to various users, e.g., advertisers, brands, corporations, manufacturers, vendors, distributers, and/or the like.

Figure 6B:
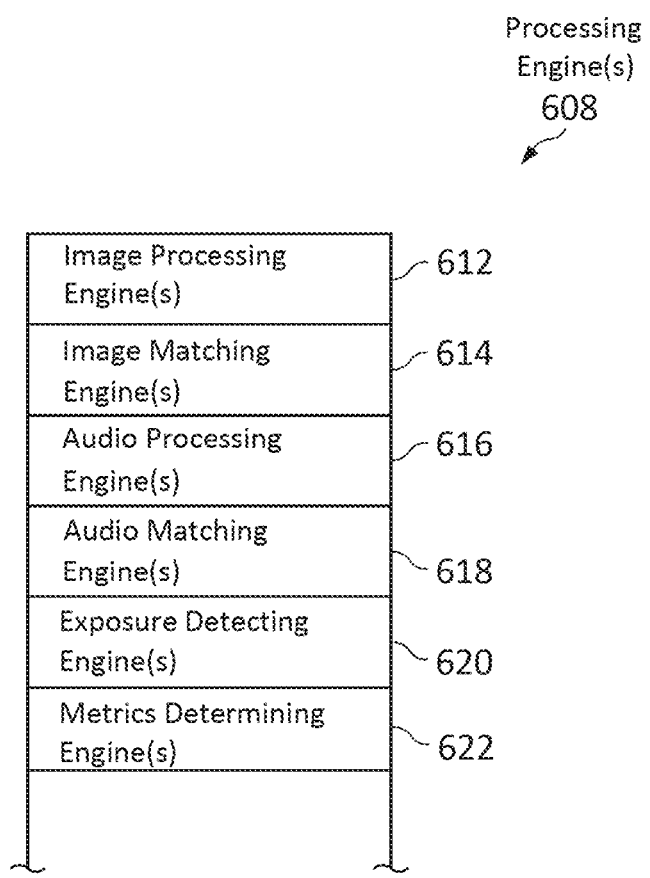
FIG. 6B is a block diagram of a processing engine, in accordance with some embodiments of the present invention.

FIG. 6B is a block diagram of the processing engines 608, in accordance with some embodiments of the present invention. The processing engines 608 include one or more image processing engine(s) 612, one or more image matching engine(s) 614, one or more audio processing engine(s) 616, one or more audio matching engine(s) 618, one or more exposure detecting engine(s) 620, and one or more metrics determining engine(s) 622.

The one or more image processing engine(s) 612 include hardware, software and/or firmware configured to process images, for example, originating from a screen of the client device 102. The images may be comprised within the source image data. Such processing of images may entail determining one or more embedded, overlaid, or distinct elements within a single image that may correspond to different events, as described in FIG. 9. Additionally, the processing may further encompass filtering out and/or removing irrelevant and/or less useful features, as described in FIG. 10. Such processing may result in more effective and effective, and less compute intensive, analysis by the image matching engines 614 in determining matches.

Figure 11:
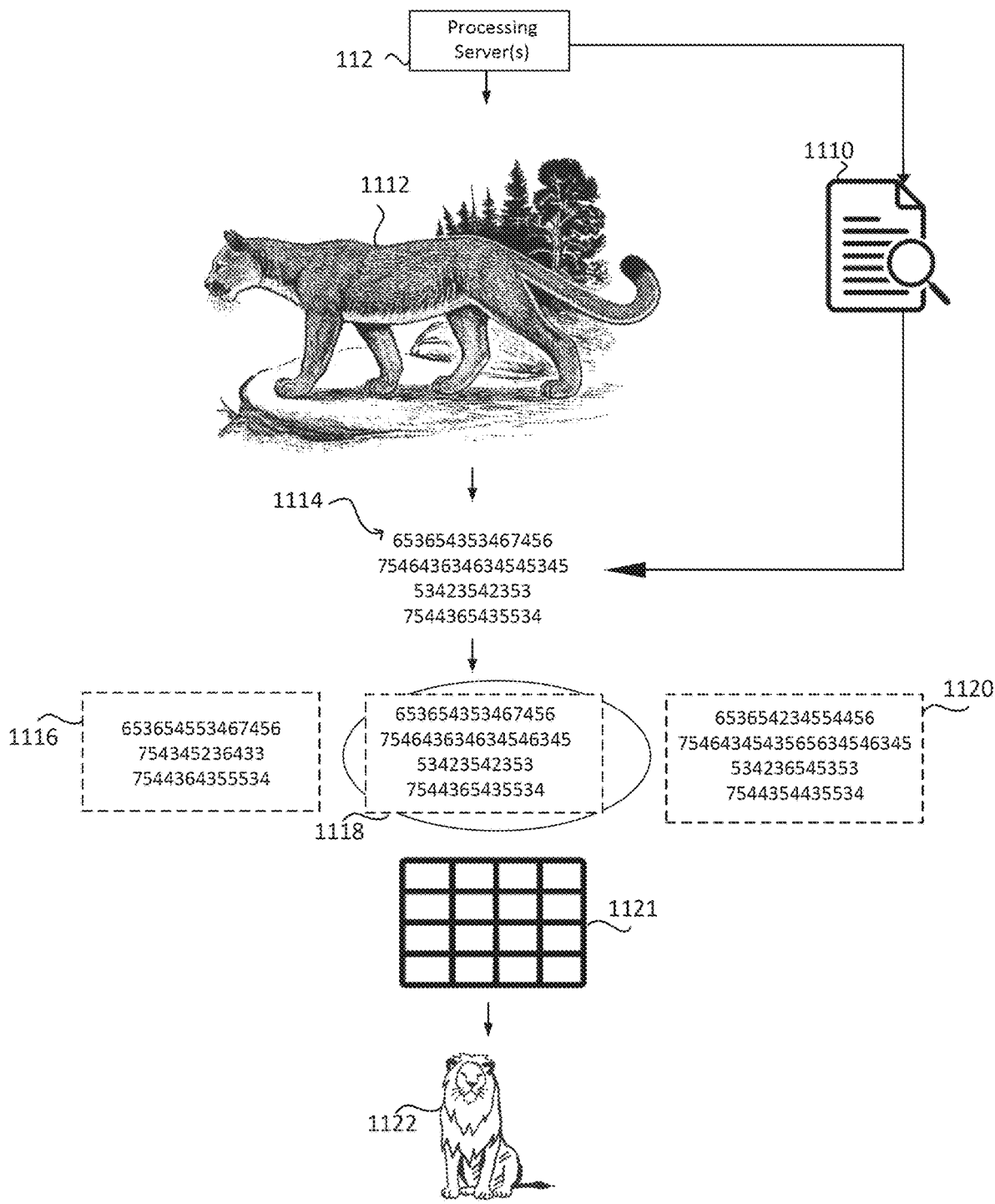
FIG. 11 is a diagram illustrating details of converting image data into a different representation to determine matches.

The one or more image matching engine(s) 614 include hardware, software and/or firmware configured to convert features and/or combinations of features of the source image data into different representations such as a vector representation, as illustrated in FIG. 11. Using these different representations, the image matching engines 614 may determine one or more matching representations within the target image data that match the different representations of the source image data most closely, and determine any matching events based on an inverted index, which maps the different representations to one or more events represented by the target image data. The image matching engines 614 are configured to determine matches without being affected by changes in color, size, translation, and/or rotation, as described in FIG. 12.

Figure 13:
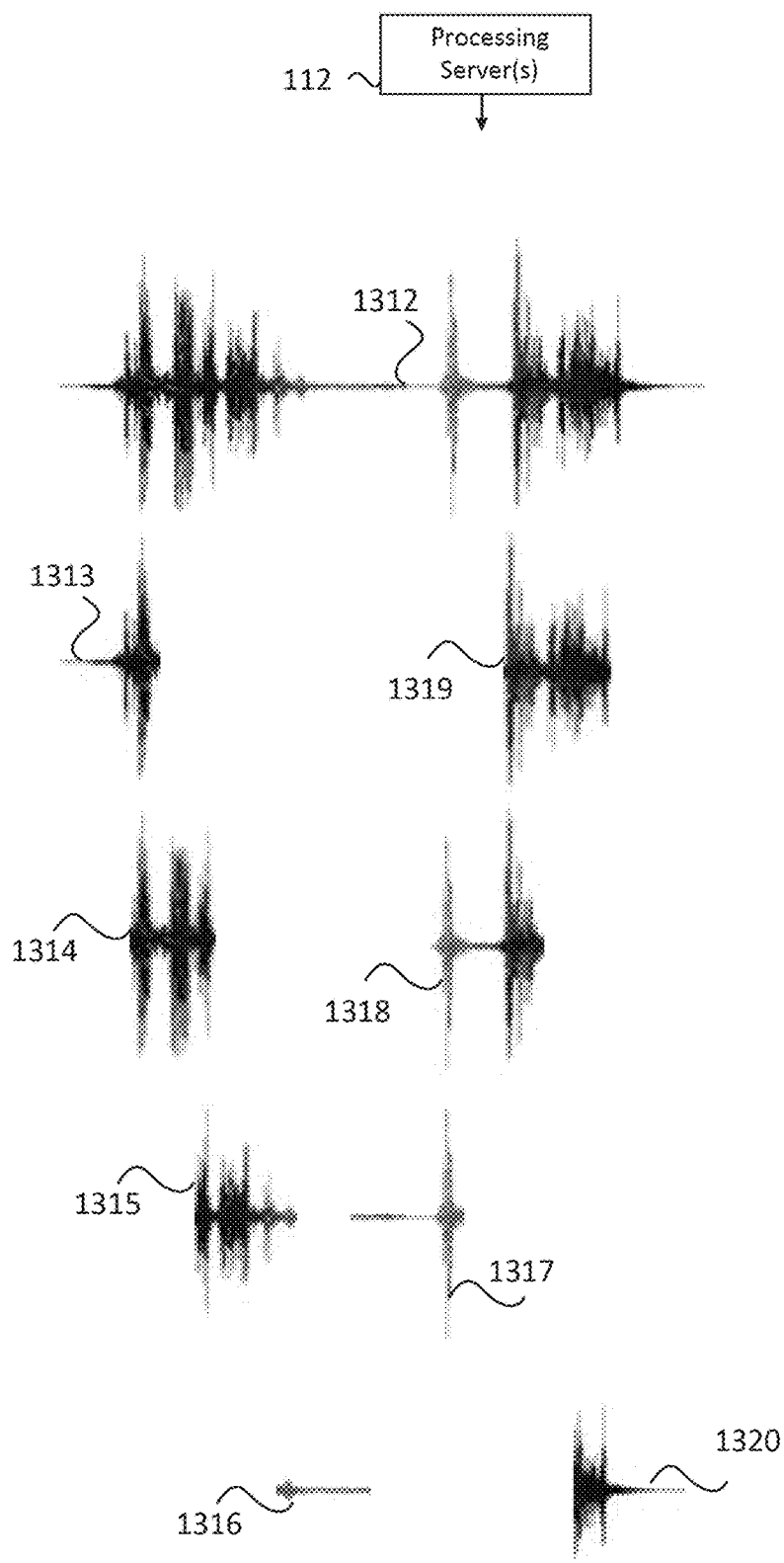
FIG. 13 is a diagram illustrating details of processing an audio stream.
Figure 15:
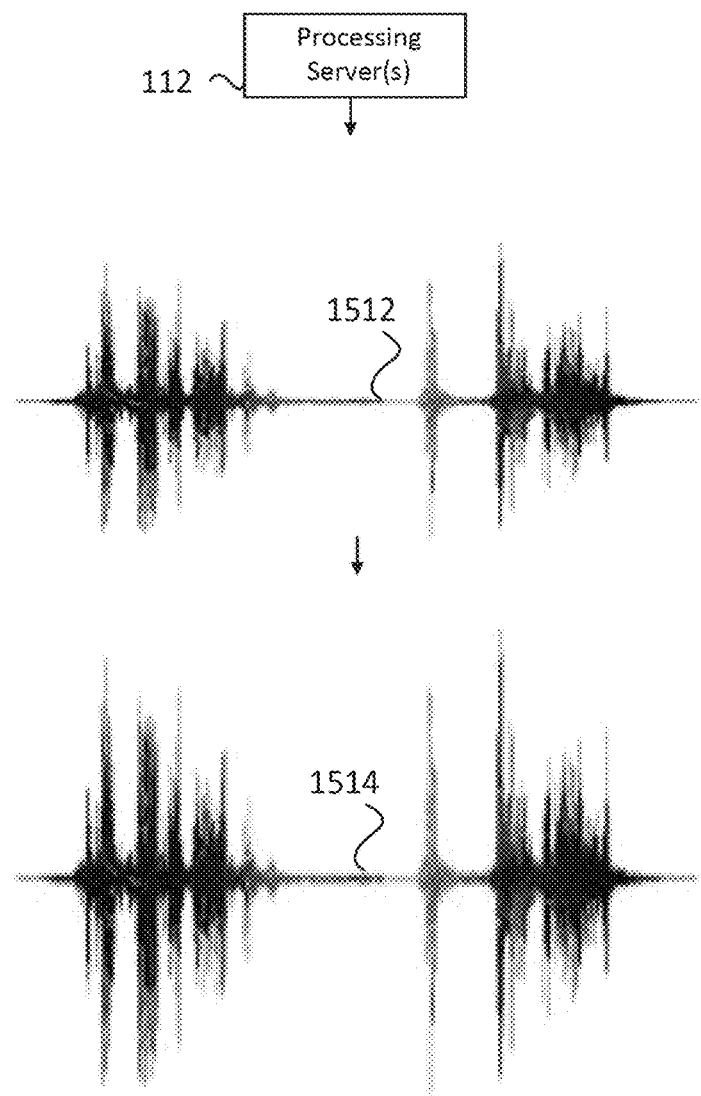
FIG. 15 is a diagram illustrating details of selectively amplifying an audio stream.

The one or more audio processing engine(s) 616 include hardware, software and/or firmware configured to process audio (e.g., the source audio data). The audio processing engines 616 may normalize, pretreat, pitch correct, and/or filter an audio stream. For example, the audio processing engines 616 may filter out extraneous background noise that is not part of, and separate from, a detected event within the source audio data. Additionally, the audio processing engines 616 may amplify certain sounds so that relevant features may be more easily discernable or detectable by the audio matching engines during matching, as illustrated in FIG. 15. The audio processing engines may divide an audio stream into multiple, partially overlapping segments, as illustrated in FIG. 13. Such a division facilitates analysis of the segments by the audio matching engines 618.

Figure 14:
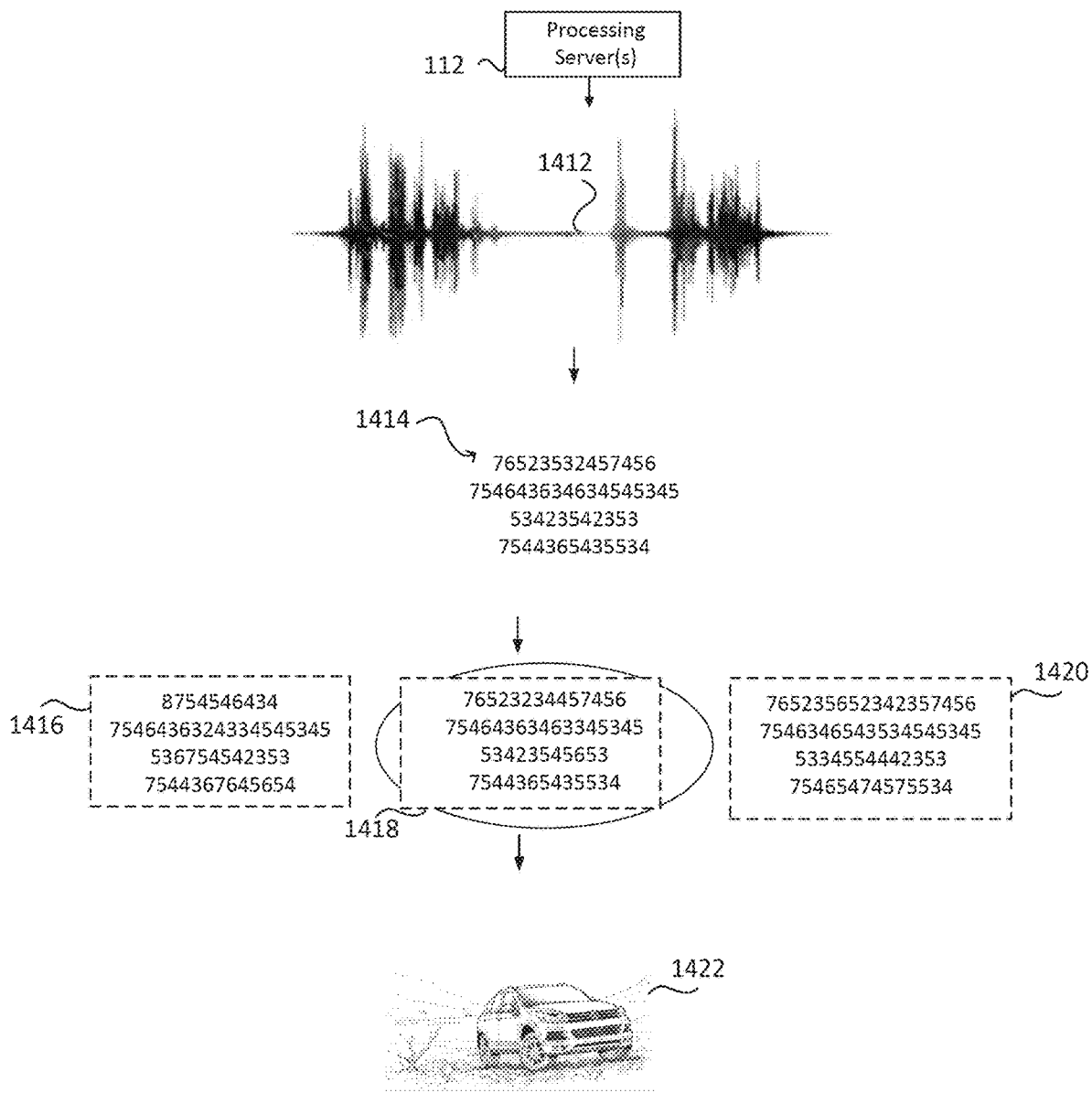
FIG. 14 is a diagram illustrating details of determining one or more potential matches or matches of advertisements to an audio stream.

The one or more audio matching engine(s) 618 include hardware, software and/or firmware configured to analyze audio to determine any matches to each audio segment by comparing against the target audio data. In particular, the one or more audio matching engine(s) 618 may convert features and/or combinations of features within the source the audio data into different representations such as a vector representation, as illustrated in FIG. 14. Using these different representations, the audio matching engines 618 may determine one or more matching representations within the target audio data that match the different representations of the source audio data most closely, and determine any matching events based on an inverted index, which maps the different representations to one or more events. The audio matching engines 618 are configured to determine matches without being affected by changes in pitch, as described in FIG. 16.

Figure 7:
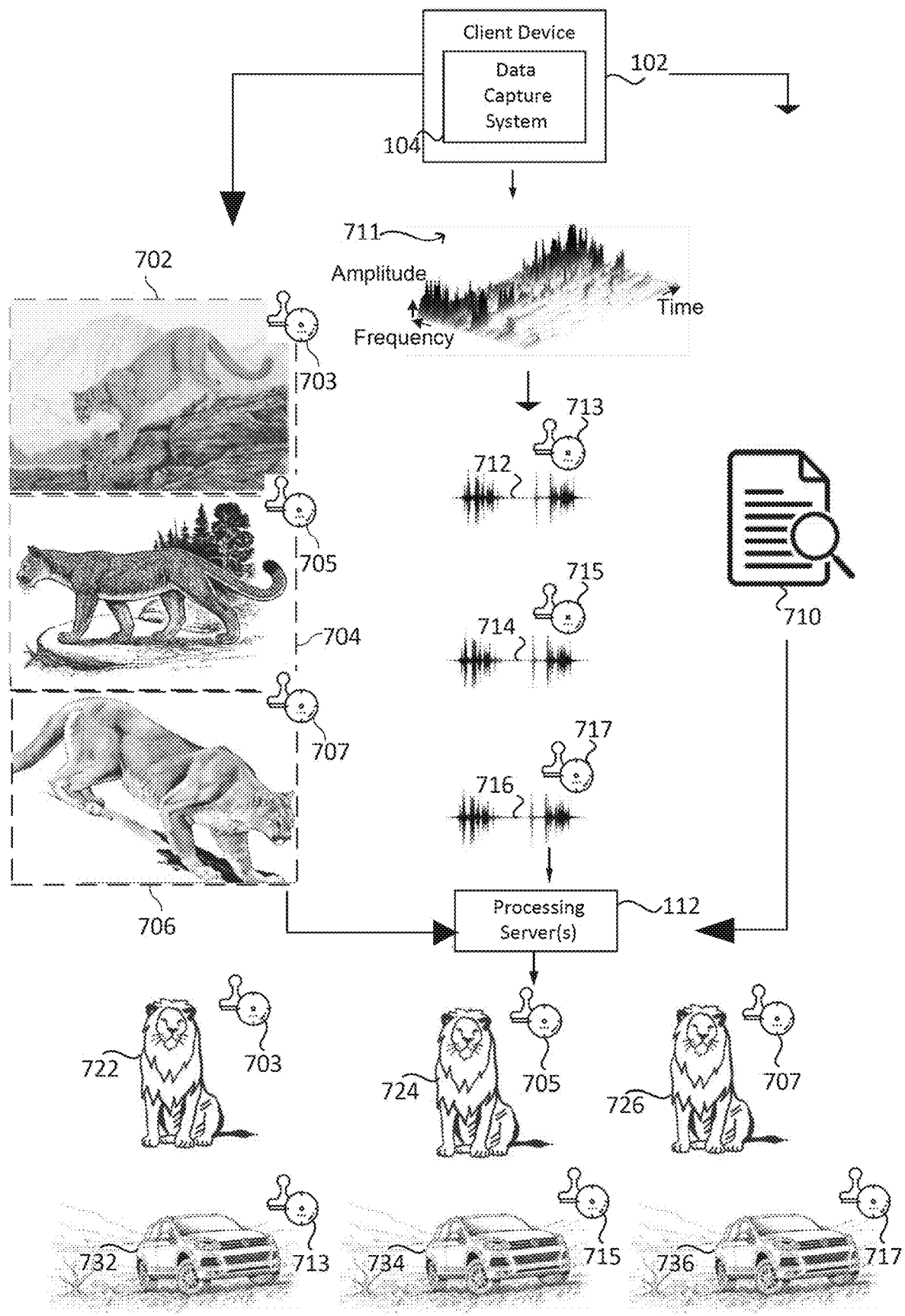
FIG. 7 is a diagram illustrating details of processing streams of data captured from the client device.
Figure 8:
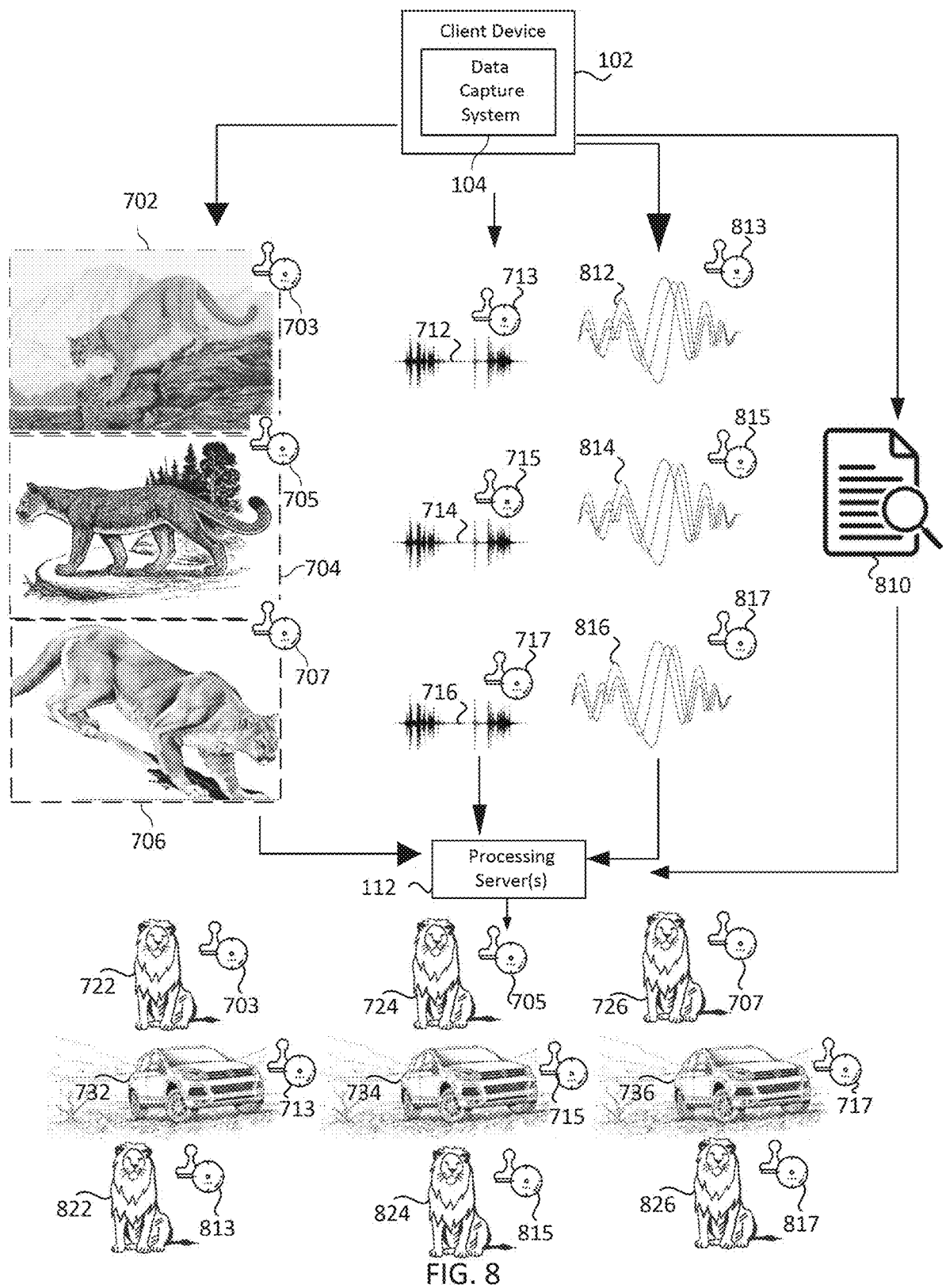
FIG. 8 is a diagram illustrating details of processing streams of data captured from the client device.

The one or more exposure detecting engine(s) 620 include hardware, software and/or firmware configured to aggregate image and/or audio matches to form an exposure to a potential event, as described, for example, with respect to FIGS. 7, 8, and 14. The exposure may constitute a single, entire event.

The one or more metrics determining engine(s) 622 include hardware, software and/or firmware configured to determine or generate one or more metrics in either text format or image format, which may be relevant to individual user and/or collective user consumption habits regarding exposures. The one or more metrics determining engine(s) 622 may be configured to predict future consumption habits and/or recommend courses of action based on the generated metrics and/or the predicted future consumption habits, as illustrated, for example, in FIG. 18.

FIG. 7 illustrates an example of streams of data (previously captured by the data capture system 104 within the client device 102 and being transmitted from the client device 102) being received by the processing servers 112, in particular, the image processing engines 612 and the audio processing engines 616. The processing servers 112, in particular, the image processing engines 612 and the audio processing engines 616, may use the streams of data in obtaining, accepting, processing, organizing, and reasoning, deriving, or inferring facts or information about the user's consumption of relevant events such as advertisements. These streams of data may include the source image data, which may include an image or visual (hereinafter "image") stream that further includes one or more image snapshots, one or more audio streams including the source audio data, and a metadata stream 710. For the image streams, the image processing engines 612 may process these streams of data individually. Following the processing, the image matching engines 614 may determine or detect any matches, from the target image data, to each image snapshot. Subsequently, the exposure detecting engines may aggregate, via temporal alignment using timestamps corresponding to each of the aforementioned streams, a subset (e.g., a portion or all of) the matches to form an exposure to an event. In particular, the image stream of the source image data may include screenshots or frames (hereinafter "screenshots") 702, 704, and 706 in a Joint Photographic Experts Group (JPEG) format having timestamps 703, 705, and 707. Although three screenshots are illustrated in FIG. 7 for the sake of example, any number of screenshots may be obtained or received in FIG. 7. A capture rate of the screenshots 702, 704, and 706 may be, for example, one, two or three frames a second, or any range, such as, between one and ten frames a second, inclusive. Thus, these three screenshots 702, 704, and 706 may have been captured within a duration of one second.

The one or more audio streams from the source audio data may be captured via a microphone of the client device 102. These audio streams may be from an external device, such as a television or a radio, or may be from the client device 102 if the client device 102 is in speaker mode. The audio streams may be manifested as a spectrogram 711 which includes axes of frequency, amplitude, and time. Additionally or alternatively, the audio streams may be divided into different audio segments 712, 714, and 716 having respective timestamps 713, 715, and 717. The timestamps 713, 715, and 717 may be taken at same times or approximately same times as the timestamps 703, 705, and 707.

Meanwhile, the metadata stream 710 may encompass image stream metadata, audio stream metadata such as ambient metadata, and client device metadata of the client device 102. The metadata 710 may include the timestamps 703, 705, 707, 713, 715, and 717. In particular, the metadata 710 include previously described client device information (e.g., remaining battery life, applications installed, storage resources, memory resources, processor (e.g., central processing unit, CPU) level, etc.), user behavior information (e.g., whether a call is in process, the currently active application, whether the screen is on or off, whether media is being consumed, URL information, device mode of operation (e.g., do-not-disturb mode), etc.), and/or ambient information (e.g., time stamps (e.g., time of day), geolocation, whether the client device connected to a WiFi channel 108, signal level and/or signal stability of a wireless signal, cellular channel 106 or disconnected, whether the client device 102 is plugged in, etc.), as previously described in FIG. 3.

The processing engines 608, in particular, the audio processing engines 616, may remove or filter out noise, from the source audio data, that is external to an advertisement or other event (multimedia content, newscast, etc.). Although embodiments herein are being described in the context of identifying an exposure to an advertisement, one skilled in the art will recognize that the system can be used to capture an exposure to other events. Such noise may include ambient noise, such as wind, a baby crying, construction, and/or vehicles such as cars or airplanes flying. These noises may be detected as independent waveforms having peaks and valleys. The filtering may be facilitated by separating the audio streams into the different audio segments 712, 714, and 716 which represent windows that are partially overlapping and/or phased, as illustrated in FIG. 13. By filtering out these noises, the audio matching engines 616 may more accurately analyze the audio stream to detect matches or potential matches to the advertisement or other relevant event.

The processing servers 112, in particular, the image matching engines 614, may identify one or more matches, from the target image data, to an event such as an advertisement contained within each of the screenshots 702, 704, and 706, and may identify an exposure to the event if that screenshot(s) has been viewed for more than a threshold duration of time, such as one or two seconds. The image matching engines 614 may further determine or predict a probability of one or more matches between each of the screenshots 702, 704, and 706 and the potential events. In particular, the image matching engines 614 may determine respective highest probability matches 722, 724, and 726 to the screenshots 702, 704, and 706. In some examples, the image matching engines 614 may determine multiple possible matches to a single screenshot. The determination of the matches may be based on one or more features extracted from the screenshots 702, 704, and 706, and relevant portions extracted from the metadata 710, as will be described in FIG. 11. Upon determining an existence of one or more matches corresponding to a set of screenshots such as the screenshots 702, 704, and 706, the image matching engines 614 may evaluate additional screenshots to refine a determination of the matches.

As shown in FIG. 7, by extracting relevant portions of the metadata 710, and determining that the matches 722, 724, and 726 occur at consecutive timestamps through temporal alignment, the exposure detecting engines 620 may determine that the matches 722, 724, and 726 occur at consecutive time intervals and correspond to a single event. If the image matching engines 614 determine multiple possible matches to a single screenshot, then the exposure detecting engines 620 may determine if a common match appears across sequentially adjacent screenshots. If so, the exposure detecting engines 620 may determine that the common match corresponds to a single event that spans the sequentially adjacent screenshots. The exposure detecting engines 620 may aggregate the matches 722, 724, and 726 to infer a single exposure, which may include multiple matches that are related and/or sequential in time (while accounting for dropped frames). An exposure may constitute an entire event (e.g., an entire advertisement). The aggregating of matches may entail detecting any dropped or duplicated frames and accounting or reconciling for such dropped or duplicated frames. In some examples, if a gap in time occurs between two matches, and if that gap exceeds some threshold duration, the exposure detecting engines 620 may determine that these two matches correspond to separate exposures or event instances. In some examples, after every match is found by the image matching engines 614, the exposure detecting engines 620 may map or group that match within an exposure.

Likewise, in an analogous manner, the audio matching engines 618 may further determine one or more matches, from the target audio data, to the audio segments 712, 714, and 716. For example, the audio matching engines 618 may determine highest probability matches 732, 734, and 736 to the audio segments 712, 714, and 716, respectively. After the audio matching engines 618 determine one or more matches, the exposure detecting engines 620 may extract relevant portions of the metadata 710, and determine that the matches 732, 734, and 736 occur at consecutive timestamps. In such a manner, the exposure detecting engines 620 may determine that the matches 732, 734, and 736 correspond to a single event, which is different from the event corresponding to the matches 722, 724, and 726. However, in other examples, the matches 732, 734, and 736 may correspond to a same or related event as the matches 722, 724, and 726. If the matches 732, 734, and 736 fail to correspond to any image output, then the exposure detecting engines 620 may determine that the matches 732, 734, and 736 are limited to television and/or radio, and are excluded from client devices. In some examples, the exposure detecting engines 620 may aggregate the matches 722, 724, 726, 732, 734, and 736 to determine not only what a user or operator of the client device 102 was viewing on a screen of the client device 102 but also ambient noise and/or other advertisements or content being accepted or consumed simultaneously. In some examples, the exposure detecting engines 620 may determine that, despite the matches 732, 734, and 736, there exists a distraction signal based on the metadata 710, for example, which may indicate an activity level on the client device 102, such as viewing other windows or pages, and/or entering information. A distraction signal may indicate that a user was not paying attention to the matching event, and thus did not consume the event.

In other examples, the exposure detecting engines 620 may determine a correlation between matches of different media (e.g., images and audio). For example, the processing engines 608 may infer or predict that two events or event types on different media tend to be consumed at same times or a common range of times, or that an event or event type tends to be consumed during a certain range of times, and precede or follow consumption of a different event or event type.

Next, FIG. 8 illustrates an example of the processing servers 112, in particular, the image processing engines 612 and the audio matching engines 618, obtaining and processing the streams of data (e.g., the source image data, the source audio data). In FIG. 8, an additional audio stream may be processed as compared to FIG. 7. In some examples, the additional audio stream may be captured internally to the client device 102, and may correspond to audio associated with the screenshots 702, 704, and 706. The additional audio stream may include additional audio segments 812, 814, and 816 having respective timestamps 813, 815, and 817. In some examples, the timestamps 813, 815, and 817 may have been captured at same times or approximately same times as the timestamps 713, 715, and 717, respectively, and/or the timestamps 703, 705, and 707, respectively. Using same or similar principles as described in FIG. 7, the processing servers 112, in particular, the audio matching engines 618, may identify one or more matches to each of the additional audio segments 812, 814, and 816. The audio matching engines 618 may determine (or predict) a probability of matches between each of the additional audio segments 812, 814, and 816 and the potential events. In particular, the audio matching engines 618 may determine respective highest probability matches 822, 824, and 826 to the additional audio segments 812, 814, and 816. The determination of the matches may be based on one or more features of the additional audio segments 812, 814, and 816, as described in FIG. 8. Next, the exposure detecting engines 620 may extract relevant portions of metadata 810. The metadata 810 may encompass the metadata 710 in addition to metadata regarding the additional audio segments 812, 814, and 816. From the metadata 810, the exposure detecting engines 620 608 may determine that the matches 822, 824, and 826 occur at, or correspond to, consecutive timestamps 813, 815, and 817. In such a scenario, the exposure detecting engines 620 may determine that the matches 822, 824, and 826 correspond to a single event. This event may be the same event that corresponds to the screenshots 702, 704, and 706, indicating that the additional audio stream is originating from the same event as the image stream. In other examples, if a user of the client device 102 is listening to a different audio stream than is associated with the image stream, for example, from another device such as a television, then the exposure detecting engines 620 may determine that the matches 822, 824, and 826 may correspond to a different event. In some examples, the timestamps 813, 815, and 817 may indicate same or nearly same times as the timestamps 703, 705, and 707, respectively, and/or the timestamps 713, 715, and 717, respectively. The exposure detecting engines 620 may aggregate the matches 722, 724, 726, 732, 734, 736, 822, 824, and 826 to determine not only what a user or operator of the client device 102 was viewing on a screen of the client device 102 but also ambient noise and/or other advertisements or content being consumed simultaneously.

Figure 9:
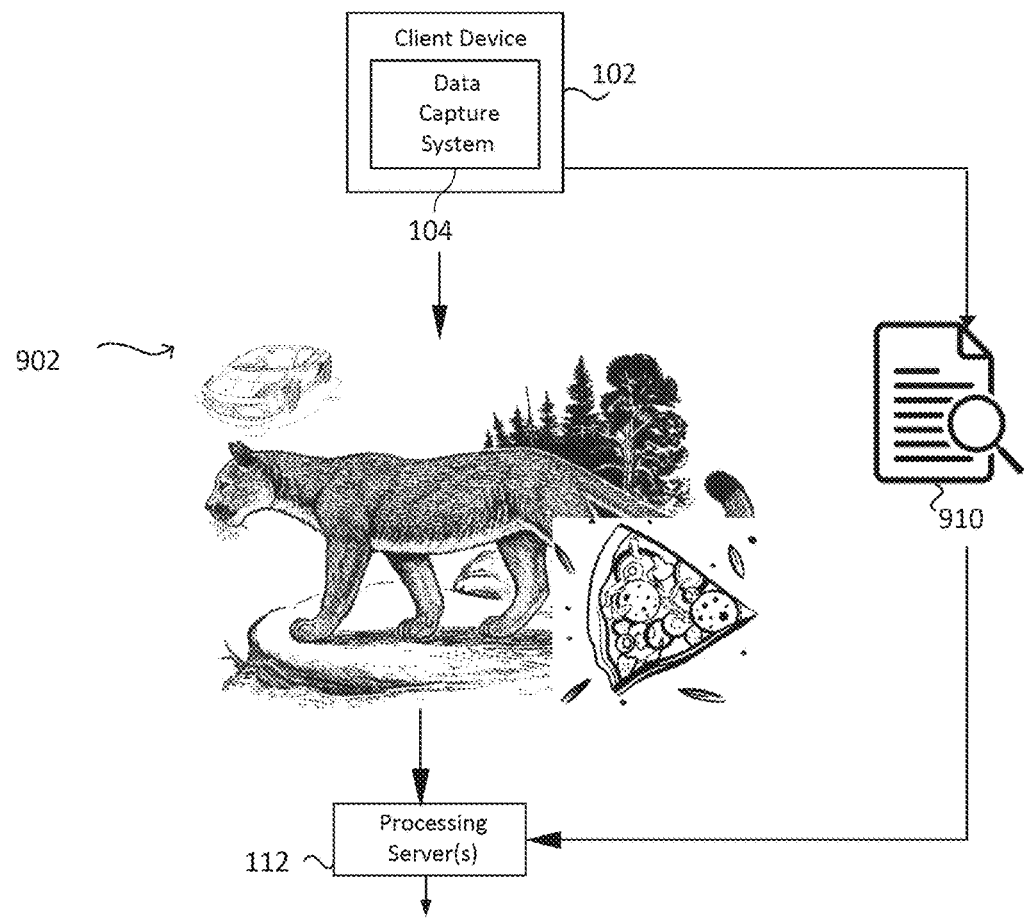
FIG. 9 is a diagram illustrating details of separating embedded or overlaid elements obtained from a screenshot of the client device.
Figure 9:
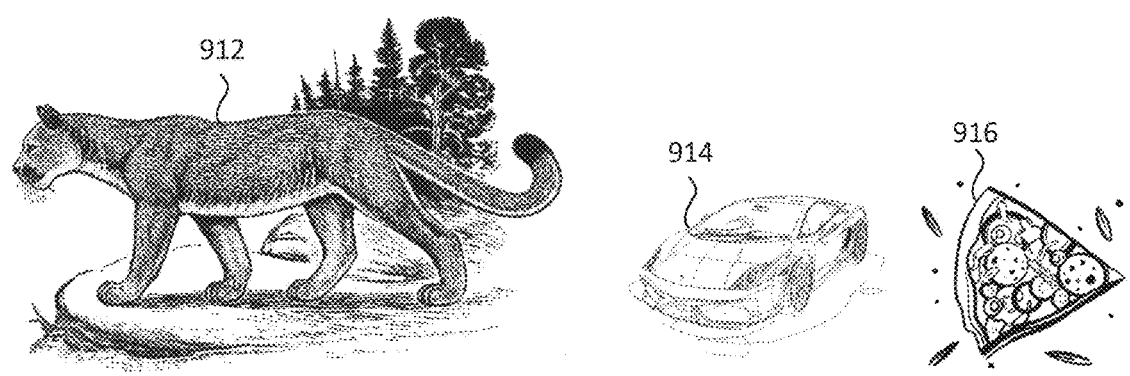

FIG. 9 illustrates a function of the processing servers 112, in particular, the image processing engines 612, processing an image stream, including a screenshot 902, to separate embedded, overlaid, and/or distinct elements, such as content and/or advertisements. The image processing engines 612 may detect and/or distinguish distinct content or advertisements using metadata 910. The metadata 910 may be implemented as, or similar to, the metadata 710 or the metadata 810. For example, the image processing engines 612 may determine that the screenshot 902 actually contains three distinct events, (e.g., advertisements) having dissimilar, unrelated features, that a movement pattern of the features is unique among the three events (e.g., advertisements), and/or a running time deviates among the three events (e.g., advertisements). The image processing engines 612 may further distinguish distinct events based on relative locations of features corresponding to different events. The image processing engines 612 may separate the screenshot 902 into distinct events 912, 914, and 916. Following this separation, the image processing engines 612 may analyze each of the distinct events 912, 914, and 916 to determine matches, in a same or similar process as described in FIG. 7 or FIG. 8.

Figure 10:
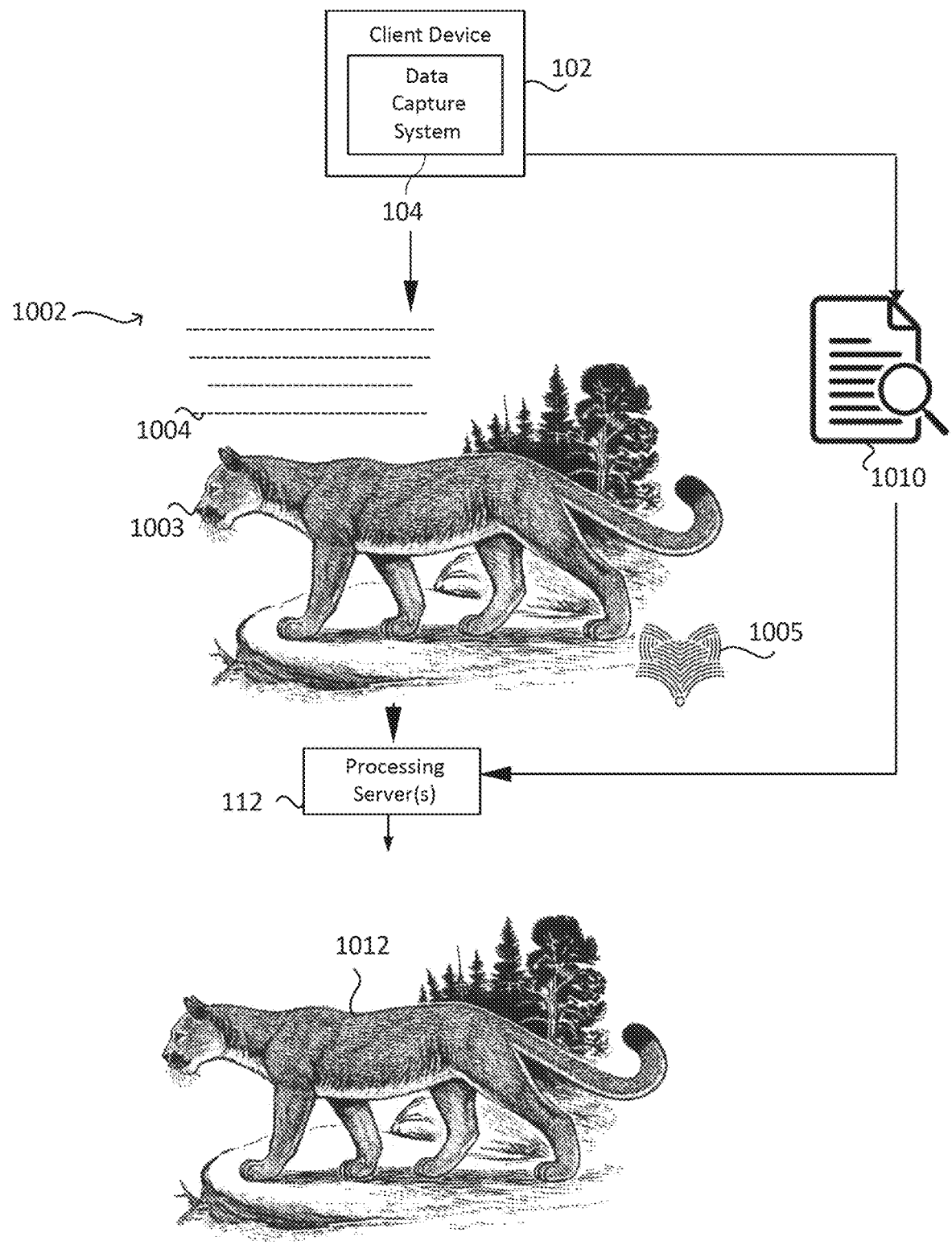
FIG. 10 is a diagram illustrating details of filtering out and/or removing irrelevant or less useful features in determining and/or analyzing matches to an image stream.

FIG. 10 illustrates a further function of the processing servers 112, in particular, the image processing engines 612, processing an image stream within the source image data, including a screenshot 1002, to filter out and/or remove irrelevant or less useful features in determining and/or analyzing matches. The image processing engines 612 may detect and/or distinguish such features using metadata 1010. The metadata 1010 may be implemented as, or similar to, the metadata 710, the metadata 810, or the metadata 910. For example, the image processing engines 612 may detect or determine dense text 1004 to be filtered out or removed. In particular, the dense text 1004 may exclude logos specific to the advertisement. The dense text 1004 may constitute blocks or sections of text that exceed a certain length or size. What constitutes dense text may also be determined based on content within the blocks or sections. Thus, the processing engines 608 may refrain from filtering out any other text besides dense text 1004, and/or leave or retain such other text. Additionally, the image processing engines 612 may filter out unrelated signs, logos, and/or insignia that are irrelevant to the content of an advertisement displayed in the screenshot 1002 itself, such as, a logo 1005. The image processing engines 612 may detect such unrelated logos, for example, by detecting whether any logos are present on any screenshot and not specific to a particular screenshot or set of screenshots, and/or presence of such logos at particular relative positions within the screenshot 1002. In some examples, the filtering out by the image processing engines 612 may further be based on a screen resolution of the client device 102. Upon filtering out the aforementioned features, the image processing engines 612 may generate and output a simplified or condensed (hereinafter "condensed") screenshot 1012. Additionally or alternatively, the image processing engines 612 may reduce or downsize a resolution of the screenshot 1012. Therefore, by outputting the condensed screenshot 1012, the image processing engines 612 may simplify and shorten the determination of matches and/or analysis of the screenshot 1002, thereby conserving computing resources and storage footprint that would have otherwise been consumed to store, within the data storage 606, and to process the dense text 1004 and the logo 1005. In some examples, the condensed screenshot 1012 may constitute less than half, such as 27 percent, of content present in the screenshot 1012, thereby greatly reducing a storage footprint and simplifying processing and analysis of the condensed screenshot 1012 compared to the screenshot 1002.

FIG. 11 illustrates an example method of the processing servers 112, in particular, the image matching engines 614, processing an image stream, including a screenshot 1112, to determine one or more potential matches or matches of events within the target image data. The image matching engines 614 may convert features and/or combinations of features of the screenshot 1112 into different representations such as a vector representation, alphanumeric representation, a word representation, and/or an integer representation (hereinafter "representation") 1114. This conversion may also be based on metadata 1110, which may be implemented in a same or similar manner compared to the metadata 710, 810, 910, or 1010. The image matching engines 614 may compare the representation 1114, or extracted key features or key words from the representation 1114, to those of other representations 1116, 1118, and 1120, such as existing representations, that correspond to existing events (e.g., advertisements). In some examples, in every screenshot, between 400 and 750, or between 100 and 1000, key words or key features may be extracted for comparison. The image matching engines 614 may determine a score indicative of a confidence level and/or a degree or extent of matching between each of the other representations 1116, 1118, and 1120, and the representation 1114. The degree or extent of matching may be based, for example, on existence of certain words, integers, or vectors within the representation 1114, frequencies of appearance of those words, integers, or vectors, and positions, both relative and absolute, at which these words, integers or vectors appear, as compared with other representations 1116, 1118, and 1120.

The image matching engines 614 may determine one or more matching representations, such as related advertisements and/or other resources such as written articles in which the related events appear, within the target image data. In some examples, the image matching engines 614 may determine a closest matching representation 1118 and a corresponding event 1122 to the closest matching representation 1118. The determination may be based on an inverted index 1121 stored, for example, in the data storage 606. In particular, the image matching engines 614 may perform a boolean search against the inverted index 1121. This inverted index 1121 may map representations (e.g., the other representations 1116, 1118, and 1120) to actual events or features in the events. Thus, the image matching engines 614 may determine a mapping between the closest matching representation 1118 and the corresponding event 1122. In such a manner, the image matching engines 614 may determine a match to the screenshot 1112, as well as related event, based on a comparison of features or combination of features of an image stream to those in existing events, and degree of matching between these features or combination of features to those in existing events.

Figure 12:
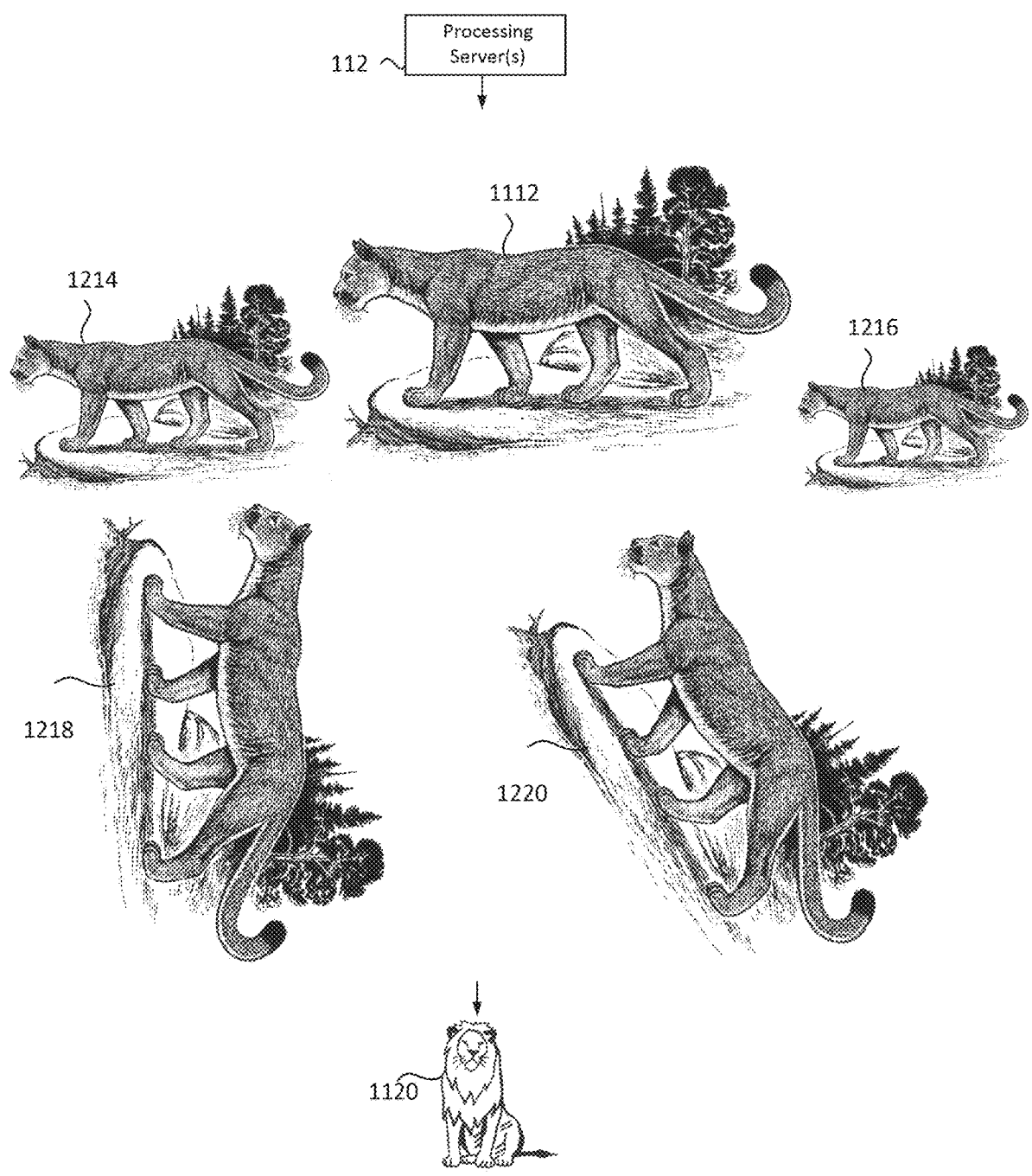
FIG. 12 is a diagram illustrating details of determining matches while enforcing or complying with color, size, translation and/or rotational invariance.

FIG. 12 illustrates a further attribute of the processing servers 112, in particular, the image matching engines 614, during processing of an image stream within the source image data, including the screenshot 1112, to determine one or more potential matches or matches of events, while enforcing or complying with color, size, translation and/or rotational invariance. First, the image processing engines 612 may remove or strip out color from the screenshots. In particular, the image matching engines 614 may generate common matches or common potential matches within the target image data, to which the source image data is searched against, for screenshots 1214 and 1216 having different sizes, as long as relative sizes among features in the screenshots 1112, 1214, and 1216, and/or spacing among features, is constant. Invariance to size or scaling may be attained by pyramiding of a feature set, which may include key points within the screenshot 1112. Pyramiding may entail generating a Difference of Gaussian (DoG) pyramid, which represents different image scales. The image matching engines 614 may compare features within the screenshot 1112 to one or more features in the screenshots 1214 and 1216 based on Euclidean distances of respective feature vectors. In particular, the image matching engines 614 may continuously, over several iterations, shrink and extract the feature set, at different image scales corresponding to locations along the pyramid, and encode one or more of the extracted feature sets as a single vector.

Additionally, the image matching engines 614 may generate common matches or common potential matches for screenshots 1218 and 1220 within the source image data that have been rotated compared to the screenshots 1112, 1214, and 1216. Thus, even if a screenshot is changed in size (e.g., an entire screenshot is scaled up or down in size, while keeping aspect ratio of individual features and spacing among features consistent), or if a screenshot is rotated, the image matching engines 614 may still generate same matches or same potential matches.

FIG. 13 illustrates an aspect of the processing servers 112, in particular, the audio processing engines 616, during processing of an audio stream 1312 within the source audio data. In FIG. 13, the audio processing engines 616 may divide the audio stream 1312 into multiple overlapping segments. For example, in a ten second audio stream, the processing engines 608 may divide the audio stream into five segments of approximately 2.2 seconds long, in which each segment has a 0.2 second overlap with a previous segment. In such a manner, the audio processing engines 616 may shorten a segment while further enriching each segment with contextual information from immediate preceding segments and immediate subsequent segments, to facilitate analysis and/or matching by the audio matching engines 618. Here, in FIG. 13, the processing engines 608 may divide the audio stream 1312 into multiple overlapping segments including segments 1313, 1314, 1315, 1316, 1317, 1318, 1319, and 1320. In particular, a beginning of the segment 1314 may overlap with an ending of the segment 1313. A beginning of the segment 1315 may overlap with an ending of the segment 1314. A beginning of the segment 1316 may overlap with an ending of the segment 1315. A beginning of the segment 1317 may overlap with an ending of the segment 1316. A beginning of the segment 1318 may overlap with an ending of the segment 1317. A beginning of the segment 1319 may overlap with an ending of the segment 1318. Lastly, a beginning of the segment 1320 may overlap with an ending of the segment 1319.

The audio processing engines 616 may also have normalized, pretreated, time aligned, pitch corrected, and/or filtered the audio stream 1312 to remove other background noises such as a baby crying, other conversations, and/or ambient noises that are not part of a commercial. In some examples, such preprocessing may occur on audio clips that are approximately forty seconds long. One way to filter out other background noises is to detect numerous advertisements or other events of a limited duration, while detecting that the other background noises are occurring consistently and even spanning the different advertisements or other events.

Next, FIG. 14 illustrates an example method of the processing servers 112, in particular, the audio matching engines 618, processing an audio stream 1412 within the source audio data, to determine one or more potential matches or matches of events from the target audio data, in an analogous manner as that illustrated in previous FIGS. such as FIG. 7 and FIG. 11 for image data. The audio matching engines 618 may convert features and/or combinations of features of the audio stream 1412 into different representations such as a vector representation, alphanumeric representation, a word representation, and/or an integer representation (hereinafter "representation") 1414. This conversion may also be based on relevant portions of the metadata 1110, which may be implemented in a same or similar manner compared to the metadata 710, 810, 910, 1010, or 1110. The audio matching engines 618 may compare the representation 1414 to other representations 1416, 1418, and 1420, such as existing representations, that correspond to existing events (e.g., advertisements). The audio matching engines 618 may determine a score indicative of a confidence level and/or a degree of matching between each of the other representations 1416, 1418, and 1420, and the representation 1414. The audio matching engines 618 may determine a closest matching representation 1418 and a corresponding event (e.g., advertisement) 1420 to the closest matching representation 1418. In such a manner, the audio matching engines 618 may determine a match to the audio stream 1412 based on a comparison of features or combination of features of an audio stream, and degree of matching between these features or combination of features to those in existing events (e.g., advertisements). Once the audio matching engines 618 determine one or more matches, the exposure detecting engines 620 may group and/or associate the matches to an exposure, in an analogous process as described with respect to FIG. 7. Additionally, the exposure detecting engines 620 may apply temporal alignment to group and/or associate the matches to the audio together with the matches to the pictorial data, into a single exposure.

FIG. 15 illustrates an example method of the processing servers 112, in particular, the audio processing engines 616, processing an audio stream 1512 within the source audio data, to selectively amplify the audio stream 1512 before processing the audio stream 1512 to determine matches. A microphone of the client device 102 may selectively filter out, diminish, or dampen background or ambient sounds. Thus, the audio processing engines 616 may compensate for the aforementioned effect of the microphone of the client device 102 by selectively boosting or amplifying certain background and/or ambient signals, for example, by using band-pass filters. In particular, the audio processing engines 616 may amplify portions or an entirety of the audio stream 1512 so that any audio features are more easily discernable or detectable during processing of the audio stream 1512 to determine or detect matches.

Figure 16:
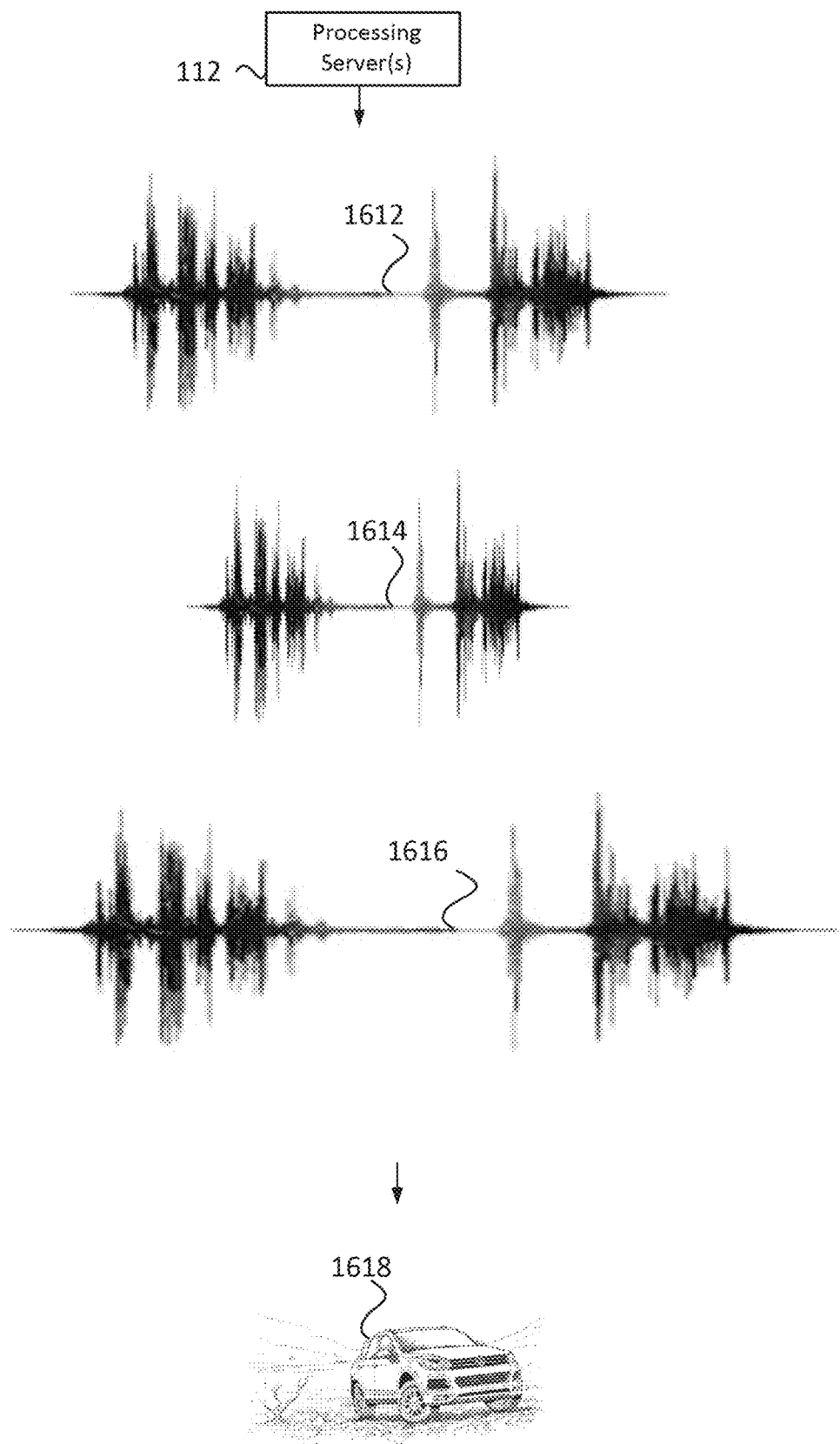
FIG. 16 is a diagram illustrating details of maintaining pitch invariance in determining matches to the audio stream.

FIG. 16 illustrates an example method of the processing servers 112, in particular, the audio matching engines 618, analyzing an audio stream 1612, to determine one or more potential matches or matches of events (e.g., advertisements) within the source audio data, while maintaining pitch invariance, in an analogous manner to that described in FIG. 12 regarding color, size, and rotation invariance for image streams. In particular, the audio matching engines 618 may generate common matches or common potential matches for audio streams 1614 and 1616 having adjusted pitches compared to the audio stream 1612, as long as relative sounds and attributes among features in the audio streams 1612, 1614, and 1616 are constant. Additionally, the audio matching engines 618 may generate common matches or common potential matches for audio streams 1612, 1614, and 1616. Thus, even if an audio stream is altered in pitch, the audio matching engines 618 may still generate same matches or potential matches. For example, certain events presented on different media may have different pitches, such as some events being up to seven percent faster or slower on television and/or radio. In such circumstances, events having different pitches but otherwise having same content would be analyzed and/or processed identically.

Figure 17:
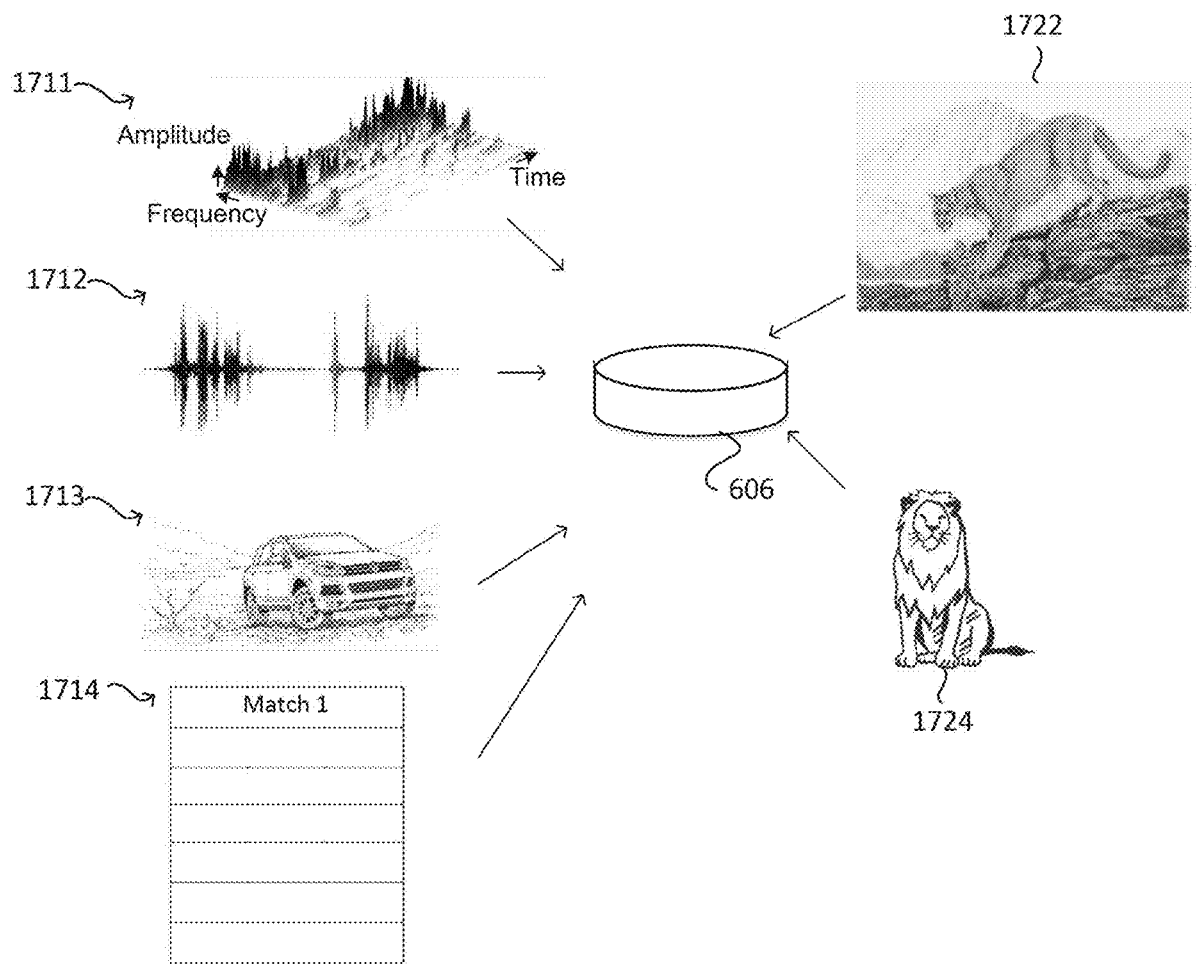
FIG. 17 is a diagram illustrating a manner of storing image and audio data.

FIG. 17 illustrates a manner of storing data within the data storage 606. In particular, an audio asset, such as an audio stream 1711, which may be implemented as or similar to the audio stream 711, along with individual audio segments such as an audio segment 1712, which may be implemented as any audio segments previously described such as the audio segment 712, may be stored within the data storage 606. In some examples, the data storage 606 may include both physical and cloud storage components. The audio segment 1712 may be manifested as a .wav file. For example, the audio stream may be 15 minutes in duration and the individual audio segments may be under one minute in duration each, such as forty seconds each. Additionally, the data storage 606 may further store any matches 1713 and a table 1714 indicating or summarizing any matches. The table 1714 may also indicate any timestamps associated with the matches. The table 1714 may be stored separately from the audio stream 1711, the audio segment 1712, and the any matches 1713. Moreover, the data storage 606 may store one or more screenshots 1722 and any matches 1724 to the screenshots 1722. The screenshots 1722 may be modified or recreated compared to screenshots received from the client device 102.

The processing engines 608, in particular, the metrics determining engines 622, may, following determination of one or more matches corresponding to events as described in any of the FIGS. 7-16, analyze the one or more matches to determine and/or predict consumption habits or consumption data of a user of the client device 102. In particular, the metrics determining engines 622 may determine or obtain, from the exposure detecting engines 620, a duration over which an event is viewed, and/or ambient conditions during which the event is viewed. The metrics determining engines 622 may obtain information, from the exposure detecting engines 620, whether any other behavior constitutes a distraction signal and/or is likely causing an event to be ignored based on a level and/or a type of user activity on the client device 102. For example, if actions such as button pressing and/or scrolling are being performed on the client device 102 with at least a threshold frequency at the same time or the other content is being played, then the metrics determining engines 622 may obtain an indication that the other behavior and/or content constitute a distraction signal and thus the event is likely being ignored.

Figure 18:
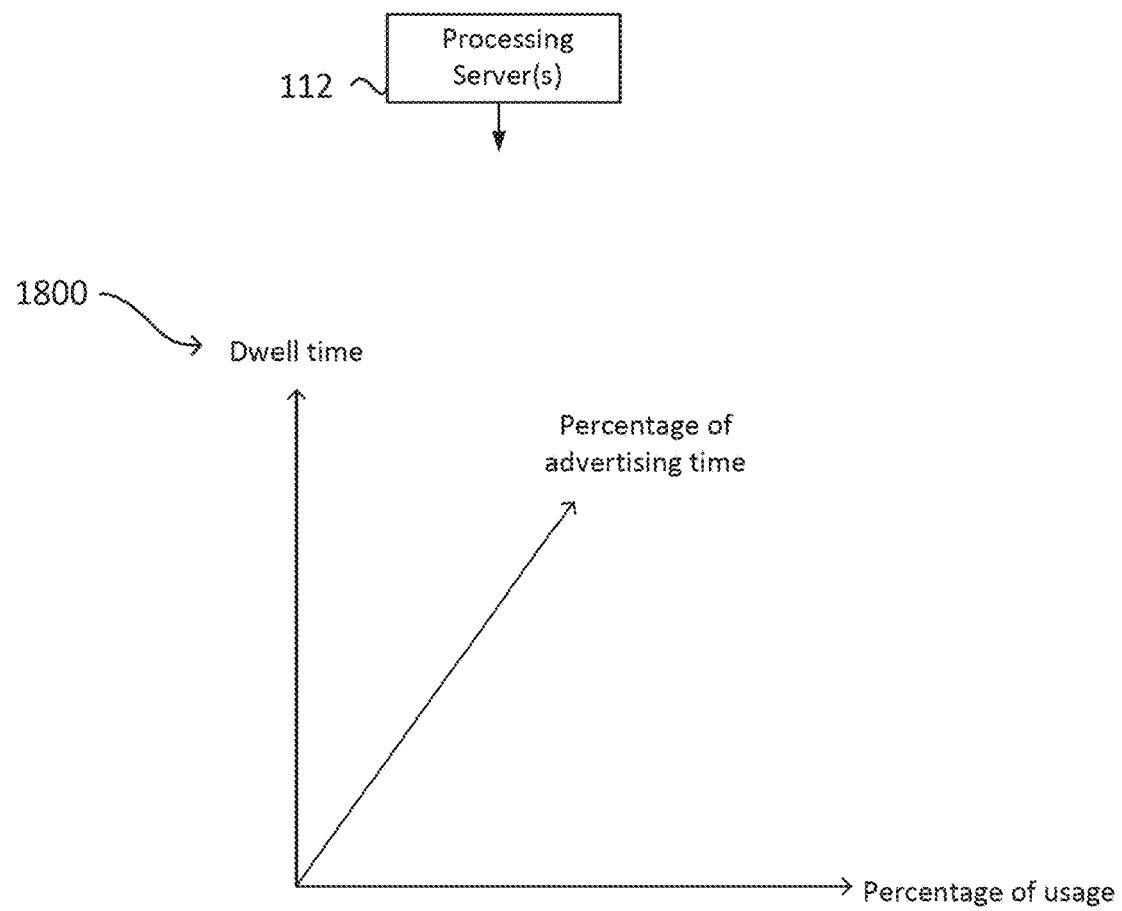
FIG. 18 is a diagram illustrating a representation of an analysis.

Using an advertisement example, the metrics determining engines 622 may generate metrics in narrative form and/or image (pictorial) form. For example, as illustrated in FIG. 18, a representation 1800, such as a 3-dimensional graph may include a first axis indicating a percentage of usage, for example, on a particular website, a particular application, and/or particular content compared to overall usage of all websites, a second axis indicating a percentage of advertising time, relative to all content or other content, on that particular website compared to overall advertising time on all websites, and a dwell time on a particular advertisement which indicates a duration in which the advertisement is viewed. The representation 1800 may encompass behavior across all users in general over a specified time period. Therefore, if the percentage of advertising time on some website is not commensurate with percentage of overall usage on that website, the metrics determining engines 622 may recommend changes in advertising time consumed. In particular, if the percentage of advertising time exceeds the percentage of overall usage on that website by some threshold, the metrics determining engines 622 may recommend shorter advertisements and/or fewer advertisements. This recommendation may be further strengthened if the dwell time is shorter than some threshold duration. On the other hand, if the percentage of overall usage exceeds the percentage of advertising time by some threshold, the metrics determining engines 622 may recommend longer advertisements and/or more advertisements. This recommendation may be further strengthened if the dwell time is longer than some threshold duration. Other metrics may include data of demographics that are consuming a particular advertisement or group of advertisements compared to one or more intended demographics of the particular advertisement or group of advertisements, in order to assess an efficacy of an advertisement or advertisement campaign. Yet other metrics may indicate changes in dwell time over a period of time, first derivatives of dwell time with respect to time, and/or second or other derivatives of dwell time with respect to time. For example, if a duration for which users are viewing one or more advertisements is decreasing over time, then the metrics determining engines 622 may recommend changing the advertisements or shortening the advertisements in an effort to increase its efficacy. Meanwhile, if a duration for which users are viewing one or more advertisements is increasing over time, then the metrics determining engines 622 may recommend either maintaining the advertisements, prolonging the advertisements, and/or creating new advertisements of similar types.

In some examples, the metrics determining engines 622 may determine or predict specific user habits corresponding to specific advertisements. For example, perhaps a specific user, such as a user of the client device 102, may tend to switch channels quickly upon seeing a particular advertisement under certain ambient conditions. In such situations, the metrics determining engines 622 may recommend or suggest a dynamic advertisement in which different versions of an advertisement may be presented under certain conditions. For example, if a specific user is also consuming other content such as television and/or radio content, the specific user may tend to switch pages on the client device 102 away from the particular advertisement more quickly compared to a scenario in which the specific user is not consuming other content. In such a situation, upon detecting that the specific user is consuming some particular television and/or radio content such as other advertisements via the aforementioned audio streams, the metrics determining engines 622 may recommend switching to a shorter version of the particular advertisement. However, upon detecting that the specific user is not consuming some particular television and/or radio content, the metrics determining engines 622 may recommend a longer version of the particular advertisement.

Figure 19:
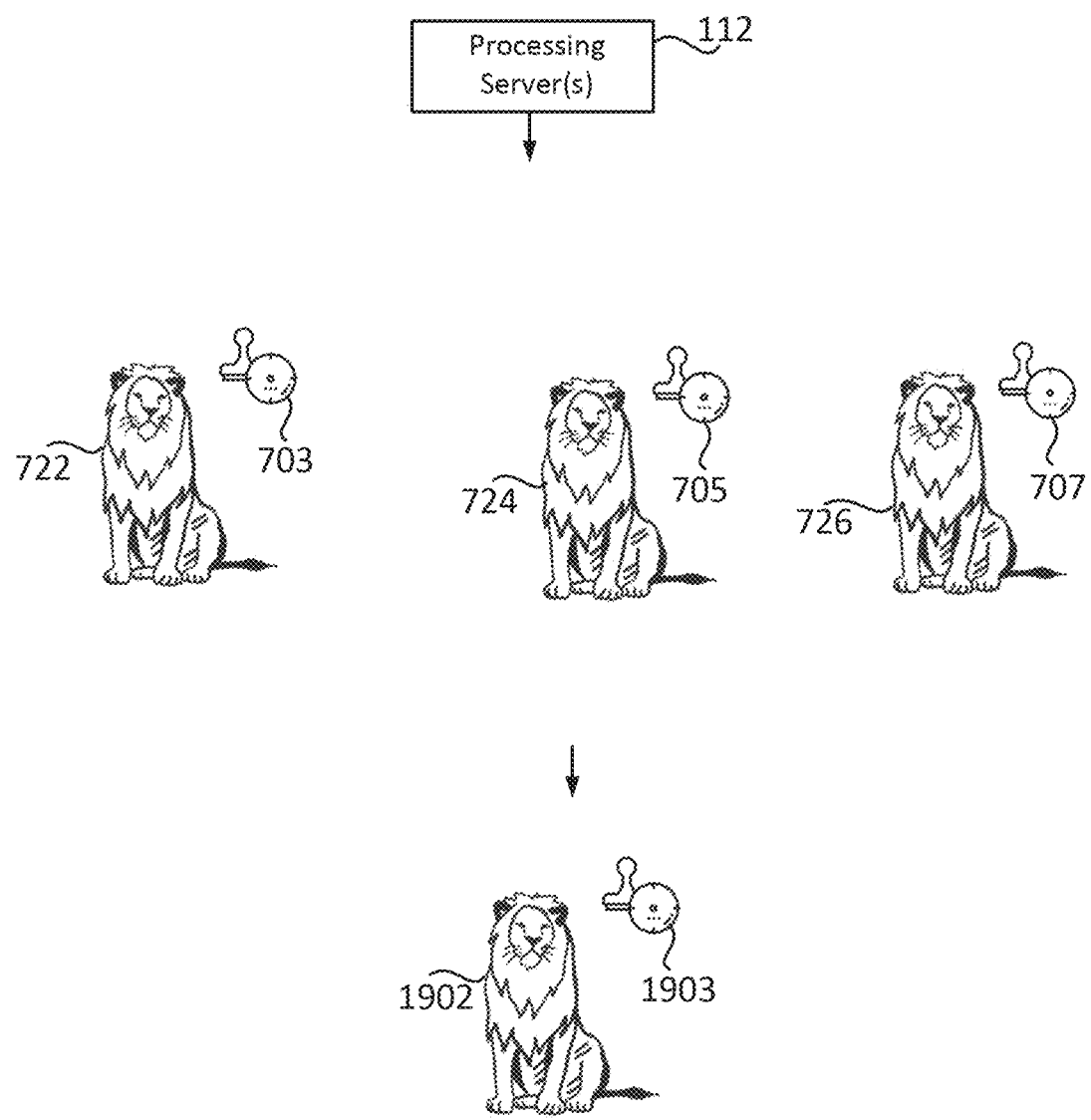
FIG. 19 is a packaging of exposures, which represent a series of matches.

As illustrated in FIG. 19, the reporting engines 610 may package any exposures, as described in FIG. 7, and incorporate any related metadata, and transmit the packaged exposures to a device such as the client device 102 and/or to a different device or user. In particular, using the example from FIG. 7, the reporting engines 610 may package the matches 722, 724, and 726 having the respective timestamps 703, 705, and 707 into an exposure 1902 having a timestamp 1903, which indicates a range of times encompassing the timestamps 703, 705, and 707.

Figure 20:
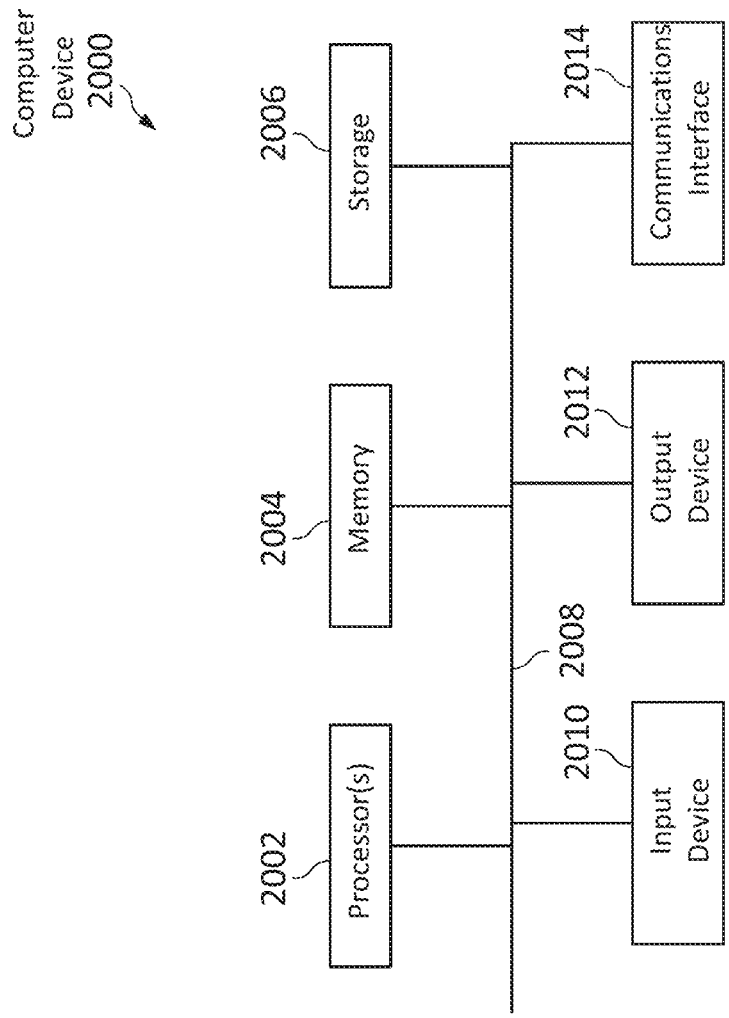
FIG. 20 is a block diagram illustrating details of a computing system.

FIG. 20 is a block diagram of a computing device 2000, in accordance with some embodiments. In some embodiments, the computing device 2000 may be a particular implementation of the client device 102 and/or of the one or more of the processing servers 112, and may perform some or all of the functionality described herein. The computing device 2000 comprises one or more hardware processor 2002, memory 2004, storage 2006, an input device 2100, and output device 2102 and/or a communications interface 2104, all communicatively coupled to a communication channel 2008.

The one or more hardware processors 2002 may be configured to execute executable instructions (e.g., software programs, applications). In some example embodiments, the one or more hardware processors 2002 comprises circuitry or any processor capable of processing the executable instructions.

The memory 2004 stores working data. The memory 2004 any include devices, such as RAM, ROM, RAM cache, virtual memory, etc. In some embodiments, the data within the memory 2004 may be cleared or ultimately transferred to the storage 2006 for more persistent retention. The term "memory" herein is intended to cover all data storage media whether permanent or temporary.

The storage 2006 includes any persistent storage device. The storage 2006 may include flash drives, hard drives, optical drives, cloud storage, magnetic tape and/or extensible storage devices (e.g., SD cards). Each of the memory 2004 and the storage 2006 may comprise a computer-readable medium, which stores instructions or programs executable by one or more hardware processors 2002.

The input device 2100 may include any device capable of receiving input information (e.g., a mouse, keyboard, microphone, etc.). The output device 2102 includes any device capable of outputting information (e.g., speakers, screen, etc.).

The communications interface 2104 may include any device capable of interfacing with external devices and/or data sources. The communications interface 2104 may include an Ethernet connection, a serial connection, a parallel connection, and/or an ATA connection. The communications interface 2104 may include wireless communication (e.g., 802.11, WiMax, LTE, 5G, WiFi) and/or a cellular connection. The communications interface 2104 may support wired and wireless standards.

A computing device 2000 may comprise more or less hardware, software and/or firmware components than those depicted (e.g., drivers, operating systems, touch screens, biometric analyzers, battery, APIs, global positioning systems (GPS) devices, various sensors and/or the like). Hardware elements may share functionality and still be within various embodiments described herein. In one example, the one or more hardware processors 2002 may include a graphics processor and/or other processors.

An "engine," "system," "datastore," and/or "database" may comprise hardware, software, firmware, and/or circuitry. In one example, one or more software programs comprising instructions capable of being executable by a hardware processor may perform one or more of the functions of the engines, datastores, databases, or systems described herein. Circuitry may perform the same or similar functions. The functionality of the various systems, engines, datastores, and/or databases may be combined or divided differently. Memory or storage may include cloud storage. The term "or" may be construed as inclusive or exclusive. Plural instances described herein may be replaced with singular instances. Memory or storage may include any suitable structure (e.g., an active database, a relational database, a self-referential database, a table, a matrix, an array, a flat file, a documented-oriented storage system, a non-relational No-SQL system, and the like), and may be cloud-based or otherwise.

At least some of the operations of a method may be performed by the one or more hardware processors. The one or more hardware processors may operate partially or totally in a "cloud computing" environment or as a "software as a service" (SaaS). For example, some or all of the operations may be performed by a group of computers being accessible via a network (e.g., the Internet) and via one or more appropriate interfaces (e.g., one or more APIs).

The performance of certain of the operations may be distributed among various hardware processors, whether residing within a single machine or deployed across a number of machines. In some embodiments, the one or more hardware processors or engines may be located in a single geographic location (e.g., within a home environment, an office environment, or a server farm). In some embodiments, the one or more hardware processors or engines may be distributed across a number of geographic locations.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A processing server system configured to assist in identifying user consumption of information, the processing server system comprising:
   one or more hardware processors; and
   memory storing computer instructions, the computer instructions when executed by the one or more hardware processors configured to perform:
      receiving image data comprising a series of screen image snapshots being presented on a screen of a client device, the screen image snapshots comprising respective timestamps;
      receiving audio data captured by a microphone of the client device;
      receiving metadata comprising image metadata, audio metadata, and client device metadata, the metadata comprising timestamps corresponding to the image data and to the audio data;
      determining one or more first matches to the image data;
      determining one or more second matches to the audio data; and
      aggregating the one or more first matches and the one or more second matches based on the metadata to identify an exposure to an event, the aggregating of the one or more first matches and the one or more second matches being based on a temporal alignment of the timestamps corresponding to the image data and the audio data.

2. The processing server system of claim 1, wherein the determining of the one or more first matches comprises converting one or more features of the image data into one or more vector representations.

3. The processing server system of claim 2, wherein the determining of the one or more first matches is according to a Boolean search against an inverted index that maps vector representations to matches.

4. The processing server system of claim 1, wherein the determining of the one or more first matches is invariant to a scaling of the image data.

5. The processing server system of claim 1, wherein the determining of the one or more second matches is invariant to a pitch of the audio data.

6. The processing server system of claim 1, wherein the instructions are configured to separate one or more embedded or overlaid elements of the image data; and the determining of the one or more first matches comprises determining the first matches for each of the one or more embedded or overlaid elements.

7. The processing server system of claim 1, wherein the instructions are configured to remove dense text from the image data.

8. The processing server system of claim 1, wherein the determining of the one or more first matches is according to one or more probabilities of matching between potential first matches and the image data.

9. The processing server system of claim 1, wherein the determining of the one or more first matches comprises determining a first match for each frame of the image data and aggregating the determined first matches for sequential frames of the image data.

10. A processor-based method of capturing user consumption of information, the method comprising:
    receiving image data comprising a series of screen image snapshots being presented on a screen of a client device, the screen image snapshots comprising respective timestamps;
    receiving audio data captured by a microphone of the client device;
    receiving metadata comprising image metadata, audio metadata, and client device metadata, the metadata comprising timestamps corresponding to the image data and to the audio data;
    determining one or more first matches to the image data;
    determining one or more second matches to the audio data; and
    aggregating the one or more first matches and the one or more second matches based on the metadata to identify an exposure to an event, the aggregating of the one or more first matches and the one or more second matches being based on a temporal alignment of the timestamps corresponding to the image data and the audio data.

11. The processor-based method of claim 10, wherein the determining of the one or more first matches comprises converting one or more features of the image data into one or more vector representations.

12. The processor-based method of claim 11, wherein the determining of the one or more first matches is according to a Boolean search against an inverted index that maps vector representations to matches.

13. The processor-based method of claim 10, wherein the determining of the one or more first matches is invariant to a scaling of the image data.

14. The processor-based method of claim 10, wherein the determining of the one or more second matches is invariant to a pitch of the audio data.

15. The processor-based method of claim 10, further comprising:
    separating one or more embedded or overlaid elements of the image data; and the determining of the one or more first matches comprises determining the first matches for each of the one or more embedded or overlaid elements.

16. The processor-based method of claim 10, further comprising removing dense text from the image data.

17. The processor-based method of claim 10, further comprising determining of the one or more first matches is according to one or more probabilities of matching between potential first matches and the image data.

18. The processor-based method of claim 10, wherein the determining of the one or more first matches comprises determining a first match for each frame of the image data and aggregating the determined first matches for sequential frames of the image data.

* * * * *